US012784763B2

(12) United States Patent
Kogami et al.

(10) Patent No.: US 12,784,763 B2
(45) Date of Patent: Nov. 3, 2026

(54) COMMUNICATION SUPPORT SYSTEM, INFORMATION PROCESSING DEVICE, COMMUNICATION SUPPORT METHOD, AND RECORDING MEDIUM

(71) Applicants: Kazuhiko Kogami, Kagoshima (JP); Akihiro Ogino, Kyoto (JP)

(72) Inventors: Kazuhiko Kogami, Kagoshima (JP); Akihiro Ogino, Kyoto (JP)

(73) Assignees: RICOH COMPANY, LTD., Tokyo (JP); KYOTO SANGYO UNIVERSITY, Kyoto (JP)

( * ) Notice: Subject to any disclaimer, the term of this patent is extended or adjusted under 35 U.S.C. 154(b) by 156 days.

(21) Appl. No.: 18/589,588

(22) Filed: Feb. 28, 2024

(65) Prior Publication Data

US 2024/0203442 A1 Jun. 20, 2024

Related U.S. Application Data

(63) Continuation of application No. PCT/JP2022/032739, filed on Aug. 31, 2022.

(30) Foreign Application Priority Data

Sep. 1, 2021 (JP) ................................. 2021-142716
Mar. 7, 2022 (JP) ................................. 2022-034693

(51) Int. Cl.
*G10L 21/10* (2013.01)
*H04N 7/15* (2006.01)

(52) U.S. Cl.
CPC ............... *G10L 21/10* (2013.01); *H04N 7/15* (2013.01)

(58) Field of Classification Search
CPC ......... G10L 21/10; G10L 25/48; G10L 25/72; H04N 7/15; H04N 7/147; G06Q 10/10
See application file for complete search history.

(56) References Cited

U.S. PATENT DOCUMENTS 11,405,589 B1 * 8/2022 Tran .................... H04L 12/1827
2015/0358583 A1 * 12/2015 Lee ..................... H04L 12/1822 348/14.08
2015/0371652 A1 * 12/2015 Ewer ....................... G10L 21/02 704/201

(Continued)

FOREIGN PATENT DOCUMENTS

JP 2014-157555 8/2014
JP 2017-201479 11/2017

(Continued)

OTHER PUBLICATIONS

International Search Report for PCT/JP2022/032739 mailed on Nov. 15, 2022, 11 pages.

(Continued)

*Primary Examiner* — Stella L. Woo
(74) *Attorney, Agent, or Firm* — XSENSUS LLP

(57) ABSTRACT

A communication support system includes processing circuitry configured to acquire a voice utterance made by a participant participating in communication and a voice utterance made by another participant participating in the communication, and to visualize a situation of the communication, based on an utterance time of the participant and an utterance time of the other participant.

19 Claims, 23 Drawing Sheets

821 1103 1101 1102

| INDEX | CALCULATION DATA | INDEX DATA OF GOOD CONFERENCE | | | | INDEX DATA OF BAD CONFERENCE | | | |
|---|---|---|---|---|---|---|---|---|---|
| | | USAGE SCENARIO 1 | USAGE SCENARIO 2 | USAGE SCENARIO 3 | AVERAGE | USAGE SCENARIO 1 | USAGE SCENARIO 2 | USAGE SCENARIO 3 | AVERAGE |
| INITIATIVE (UTTERANCE RATIO) | 0.70 | 0.67 | 0.82 | 0.69 | | 1.07 | 1.19 | 1.00 | |
| SUPERIORITY (UTTERANCE SPEED RATIO) | 0.87 | 0.41 | 0.86 | 0.47 | | 2.25 | 1.33 | 50.0 | |
| SERIOUSNESS (LONGEST UTTERANCE TIME RATIO) | 0.97 | 1.49 | 1.03 | 1.31 | | 0.92 | 1.37 | 1.24 | |
| CORRELATION COEFFICIENT | | 0.62 | 0.88 | 0.60 | 0.70 | 0.04 | 0.99 | 0.15 | 0.39 |

1104 1105

(56) References Cited

U.S. PATENT DOCUMENTS

| | | | | |
|---|---|---|---|---|
| 2017/0220997 | A1 | 8/2017 | Shima | |
| 2019/0304457 | A1 | 10/2019 | Nakano et al. | |
| 2021/0012791 | A1 | 1/2021 | Renard et al. | |
| 2021/0286952 | A1 | 9/2021 | Kagawa et al. | |
| 2022/0021724 | A1* | 1/2022 | Sivakumar | H04L 65/401 |
| 2022/0086393 | A1* | 3/2022 | Peters | H04N 7/147 |
| 2022/0165276 | A1* | 5/2022 | Yamaoka | G10L 21/028 |
| 2022/0292406 | A1* | 9/2022 | Banipal | G06N 20/20 |
| 2023/0351806 | A1* | 11/2023 | Norieda | G06V 40/176 |
| 2023/0377369 | A1* | 11/2023 | Norieda | G06V 40/174 |

FOREIGN PATENT DOCUMENTS

| | | | |
|---|---|---|---|
| JP | 2017-215931 | | 12/2017 |
| JP | 2018-124456 | | 8/2018 |
| JP | 2019-174616 | | 10/2019 |
| JP | 6664818 | | 3/2020 |
| JP | 2020-170310 | | 10/2020 |
| JP | 2021-009535 | | 1/2021 |
| JP | 2021-051633 | A | 4/2021 |
| JP | 2021-099670 | A | 7/2021 |
| WO | 2020/116531 | | 6/2020 |
| WO | 2020/196743 | A1 | 10/2020 |
| WO | 2022/004567 | | 1/2022 |

OTHER PUBLICATIONS

Extended European Search Report issued Nov. 25, 2024 in European Patent Application No. 22864615.4, 11 pages.

Office Action issued Jan. 21, 2025 in Japanese Patent Application No. 2023-545635, 11 pages.

* cited by examiner

FIG.11

621

1103 1101 1102

| INDEX | CALCULATION DATA | INDEX DATA OF GOOD CONFERENCE | | | | INDEX DATA OF BAD CONFERENCE | | | |
|---|---|---|---|---|---|---|---|---|---|
| | | USAGE SCENARIO 1 | USAGE SCENARIO 2 | USAGE SCENARIO 3 | AVERAGE | USAGE SCENARIO 1 | USAGE SCENARIO 2 | USAGE SCENARIO 3 | AVERAGE |
| INITIATIVE (UTTERANCE RATIO) | 0.70 | 0.67 | 0.82 | 0.69 | | 1.07 | 1.19 | 1.00 | |
| SUPERIORITY (UTTERANCE SPEED RATIO) | 0.87 | 0.41 | 0.86 | 0.47 | | 2.25 | 1.33 | 50.0 | |
| SERIOUSNESS (LONGEST UTTERANCE TIME RATIO) | 0.97 | 1.49 | 1.03 | 1.31 | | 0.92 | 1.37 | 1.24 | |
| CORRELATION COEFFICIENT | | 0.62 | 0.88 | 0.60 | 0.70 | 0.04 | 0.99 | 0.15 | 0.39 |

1104 1105

FIG.17

1700

| UTTERANCE START TIME | UTTERANCE END TIME | UTTERANCE TIME | SPEAKER | NUMBER OF UTTERED CHARACTERS | UTTERANCE RATIO | LONGEST UTTERANCE TIME RATIO | UTTERANCE SPEED RATIO | UTTERANCE VOLUME | UTTERANCE FREQUENCY |
|---|---|---|---|---|---|---|---|---|---|
| 2022/1/11 11:21 | 2022/1/11 11:21 | 0 | - | 0 | 0 | 0.00 | 0.00 | 0.00 | - |
| 2022/1/11 11:21 | 2022/1/11 11:21 | 8 | - | 0 | 1 | 1.00 | 1.00 | 0.00 | - |
| 2022/1/11 11:21 | 2022/1/11 11:21 | 8 | B | 50 | 1 | 1.00 | 1.00 | 105.82 | 125.50 |
| 2022/1/11 11:21 | 2022/1/11 11:21 | 0 | - | 0 | 1 | 1.00 | 1.00 | 0.00 | - |
| 2022/1/11 11:21 | 2022/1/11 11:21 | 1 | B | 3 | 1 | 1.00 | 1.00 | 34.50 | 110.00 |
| 2022/1/11 11:21 | 2022/1/11 11:21 | 2 | - | 0 | 1 | 1.00 | 1.00 | 0.00 | - |
| 2022/1/11 11:21 | 2022/1/11 11:21 | 3 | B | 12 | 1 | 1.00 | 1.00 | 84.74 | 150.10 |
| 2022/1/11 11:21 | 2022/1/11 11:22 | 9 | - | 0 | 1 | 1.00 | 1.00 | 0.00 | - |
| 2022/1/11 11:22 | 2022/1/11 11:22 | 1 | B | 10 | 1 | 1.00 | 1.00 | 75.28 | 111.91 |
| 2022/1/11 11:22 | 2022/1/11 11:22 | 1 | - | 0 | 1 | 1.00 | 1.00 | 0.00 | - |
| 2022/1/11 11:22 | 2022/1/11 11:22 | 0 | A | 3 | 1 | 1.00 | 1.00 | 32.42 | 170.30 |
| 2022/1/11 11:22 | 2022/1/11 11:22 | 6 | - | 0 | 1 | 1.00 | 1.00 | 0.00 | - |
| 2022/1/11 11:22 | 2022/1/11 11:22 | 10 | B | 34 | 1 | 1.00 | 1.00 | 92.00 | 136.96 |
| 2022/1/11 11:22 | 2022/1/11 11:22 | 0 | - | 0 | 1 | 1.00 | 1.00 | 0.00 | - |
| 2022/1/11 11:22 | 2022/1/11 11:22 | 0 | A | 3 | 1 | 1.00 | 1.00 | 32.90 | 160.00 |
| 2022/1/11 11:22 | 2022/1/11 11:22 | 1 | - | 0 | 1 | 1.00 | 1.00 | 0.00 | - |
| 2022/1/11 11:22 | 2022/1/11 11:22 | 1 | A | 3 | 1 | 1.00 | 1.00 | 31.97 | 220.50 |
| 2022/1/11 11:22 | 2022/1/11 11:22 | 4 | - | 0 | 1 | 1.00 | 1.00 | 0.00 | - |
| 2022/1/11 11:22 | 2022/1/11 11:22 | 1 | A | 11 | 1 | 1.00 | 1.00 | 27.72 | 195.30 |

COMMUNICATION SUPPORT SYSTEM, INFORMATION PROCESSING DEVICE, COMMUNICATION SUPPORT METHOD, AND RECORDING MEDIUM

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2022/032739, filed on Aug. 31, 2022, and designating the U.S., which claims priority to Japanese Patent Application No. 2021-142716 filed on Sep. 1, 2021, and Japanese Patent Application No. 2022-034693 filed on Mar. 7, 2022. The entire contents of the foregoing applications are incorporated herein by reference.

BACKGROUND OF THE INVENTION

1. Field of the Invention

The present disclosure relates to a communication support system, an information processing device, a communication support method, and a non-transitory computer-readable recording medium storing a program.

2. Description of the Related Art

A conference system that transmits and receives content data such as images and audio between multiple terminal devices has been widely used.

In addition, a conference system is known to identify the state of a business counterpart during a business negotiation based on an image, voice, or the like of the business counterpart, and to output a business strategy based on the identified state of the business counterpart (e.g., see Patent Document 1).

RELATED ART DOCUMENT

Patent Document

Patent Document 1: Japanese Patent No. 6664818

SUMMARY OF THE INVENTION

According to an embodiment of the present disclosure, a communication support system including:

processing circuitry configured to

- acquire a voice utterance made by a participant participating in communication and a voice utterance made by another participant participating in the communication; and
- visualize a situation of the communication, based on an utterance time of the participant and an utterance time of the other participant.

BRIEF DESCRIPTION OF THE DRAWINGS

FIG. 11 is a diagram illustrating calculation of a correlation coefficient of index data according to the second embodiment.

FIG. 17 is a diagram illustrating an example of extraction data according to the fourth embodiment.

DETAILED DESCRIPTION OF THE PREFERRED EMBODIMENTS

The technology disclosed in Patent Document 1 can support business negotiation so that the progress of business negotiation can be facilitated in a manner that is suitable for the business counterpart. However, in this method, information of a person in charge of the business negotiation and information of the business counterpart (training data) must be pre-registered in the system.

Such pre-registration of information may be required not only to a conference system for business negotiation, but may also be required in various communication systems for communication such as remote medical care, counseling, remote class, or school consultation.

As described above, the related-art communication system configured to support communication needs to have information of a participant who participates in the communication and information of another participant.

At least one embodiment of the present disclosure provides a communication support system capable of supporting communication without pre-registering information of a participant participating in communication and information of the other participant.

According to at least one embodiment of the present disclosure, it is possible to provide a communication support system capable of supporting communication without pre-registering information of a participant participating in communication and information of other participants.

Hereinafter, embodiments of the present disclosure will be described in detail with reference to the drawings.

<System Configuration>

Figure 1:
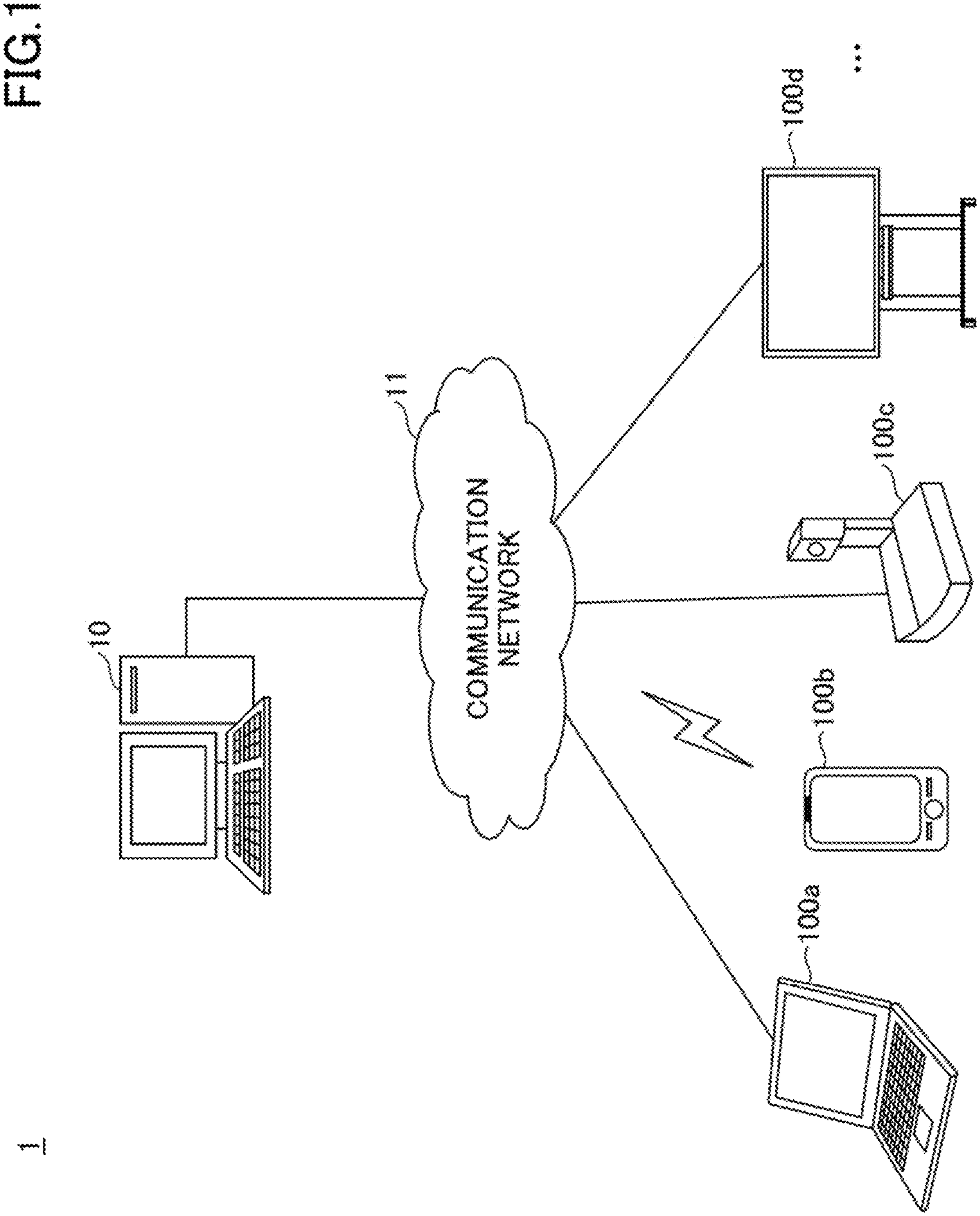
FIG. 1 is a diagram illustrating an example of a system configuration of a communication support system according to an embodiment.

FIG. 1 is a diagram illustrating an example of a system configuration of a communication system according to an embodiment. The communication support system 1 includes, for example, a conference server 10 and a plurality of terminal devices 100*a*, 100*b*, 100*c*, 100*d*, . . . , which are connected to a communication network 11, such as the Internet or a local area network (LAN). In the following description, any one of the terminal devices 100*a*, 100*b*, 100*c*, 100*d*, and the like is referred to as a "terminal device 100". The number of multiple terminal devices 100 illustrated in FIG. 1 is an example, and the number of the plurality of terminal devices 100 may be another number of two or more.

The communication support system 1 is a system that supports various communications such as business negotiations, conferences, medical care, classes, or counseling, for example, in which audio and images are transmitted and received between a terminal device 100 and one or more other terminal devices 100. Here, as an example, the following description will be given on the assumption that a communication supported by the communication support system 1 is a web conference in which a user of the terminal device 100 and a user of another terminal device 100 have a business negotiation.

The terminal device (information processing device) 100 is a general-purpose information terminal such as a personal computer (PC), a tablet terminal, or a smartphone, or an electronic apparatus having a communication function such as a video conference terminal or an electronic whiteboard, which is used by a user participating in a web conference. The electronic whiteboard is a whiteboard having an electronic whiteboard function capable of mutual communication, and is also called an interactive whiteboard (IWB). Here, as an example, the following description will be given on the assumption that the terminal device 100 is a general-purpose information terminal.

Participants in a web conference join the conference by accessing a conference address provided by the conference server 10 using, for example, a web conference application installed on the terminal device 100 or a web browser.

Here, the conference server 10 may be a server device (or a cloud service or the like) that enables general web conferencing, or may be a dedicated server (or a cloud service or the like) having a communication support function as described later.

Figure 2:
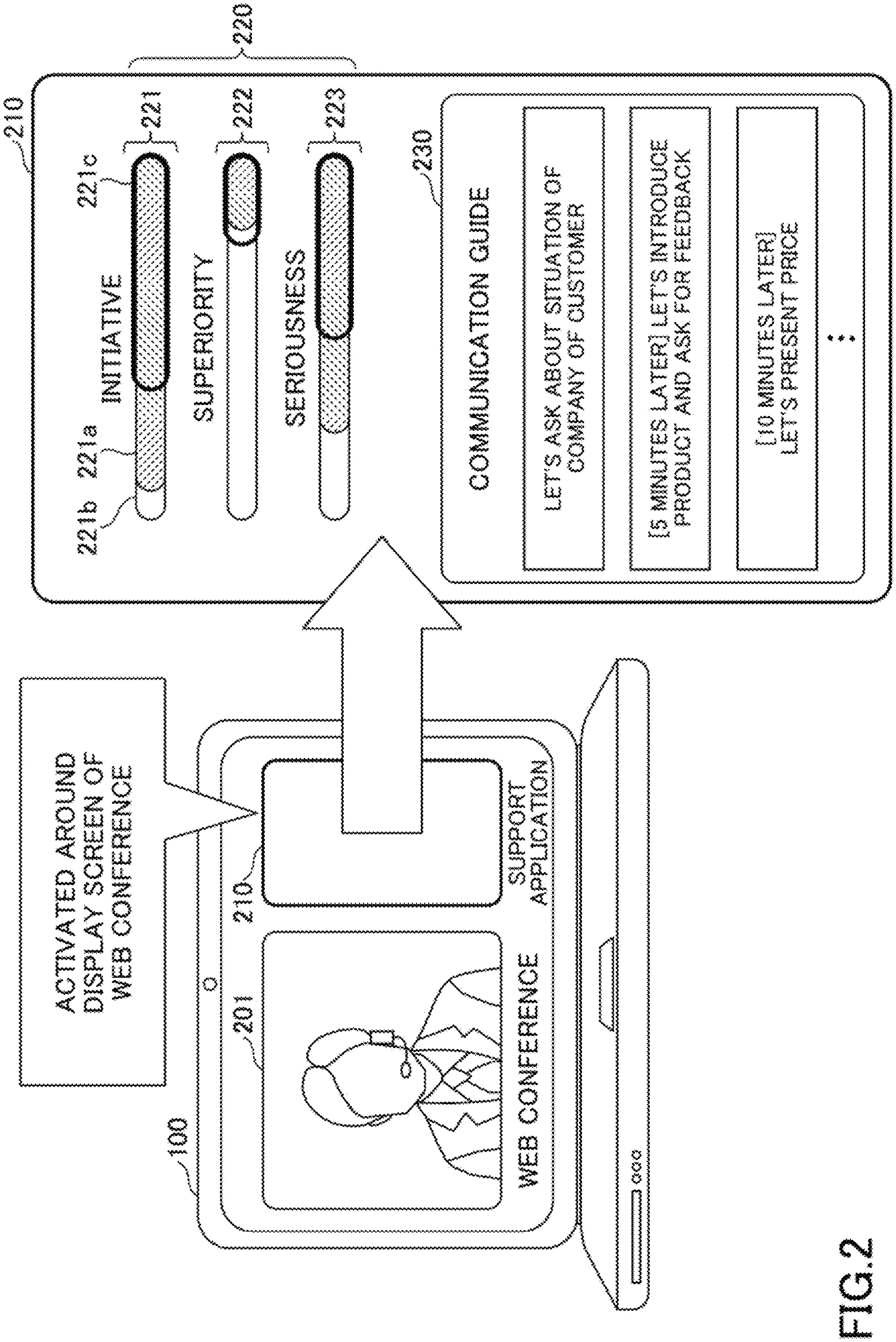
FIG. 2 is a diagram illustrating an overview of a communication support method according to an embodiment.

The participant can also start an application program for the communication support system 1 (hereinafter referred to as "support application"), for example, to display a display screen 210 of the support application around a display screen 201 of the web conference, as illustrated in FIG. 2, for example.

In the example of FIG. 2, the support application displays, on the display screen 210, initiative 221, superiority 222, seriousness 223, and the like, as an index 220 for visualizing the web conference (business negotiation). The initiative 221 represents an initiative ratio (percentage) of a participant using a terminal device 100 and another participant using another terminal device 100 in a conference, with a bar 221*a* representing the initiative of the participant and a bar 221*b* representing the initiative of the other participant. Similarly, the superiority 222 represents a ratio of the superiority of the participant and the superiority of the other participant, and the seriousness 223 represents a ratio of the seriousness of the participant and the seriousness of the other participant. Note that a method of calculating three indexes "initiative", "superiority", and "seriousness" included in the index 220 for visualizing the web conference will be described later.

As a preferable example, the support application may further display, for example, a display component 221*c* indicating a target ratio for the initiative 221. This enables the participant in the example in FIG. 2 to respond, for example, by encouraging the other participant to speak in order to approach the target ratio for the initiative. The support application may display respective display components representing a target ratio for the superiority 222 and a target ratio for the seriousness 223 in the same manner.

As another preferable example, the support application may display, on the display screen 210, a communication guide 230 that displays a message or the like for bringing the initiative 221, the superiority 222, the seriousness 223, and the like close to respective target ratios. Thus, for example, as illustrated in FIG. 2, when the participant speaks in accordance with a message "Let's ask about a situation of the company of the customer", the ratio of the other participant taking the initiative increases, and the ratio for the initiative 221 can be brought closer to the target ratio. The communication guide is an example of information indicating how to proceed with communication.

The display screen 210 illustrated in FIG. 2 is an example of a display screen for visualizing communication. A specific method of visualizing a conference will be described later with reference to a plurality of embodiments.

The system configuration of the communication support system 1 described above is an example, and the communication support system 1 may have various system configurations. For example, the display screen 210 described with reference to FIG. 2 may be provided by the conference server 10 instead of the support application executed by the terminal device 100. In such a case, the participant accesses the conference server 10 using a web browser or the like of the terminal device 100, and displays the display screen 210 as illustrated in FIG. 2 on the terminal device 100.

The communication support system 1 may be configured such that the terminal device 100 performs a web conference (interview) with other terminal devices 100 without the conference server 10. Further, the communication supported by the communication support system 1 may be various communications such as business negotiations, meetings, medical care, lessons, or counseling.

The terminal device 100 may be, for example, a dedicated electronic device, such as a video conference device or an electronic whiteboard. In this case, the terminal device 100 may display the display screen 210 as illustrated in FIG. 2 by executing a predetermined program incorporated in the terminal device 100. Alternatively, the terminal device 100 may be capable of executing a support application acquired from the outside, as in the information terminal.

<Hardware Configuration>

(Hardware Configuration of Computer)

Figure 3:
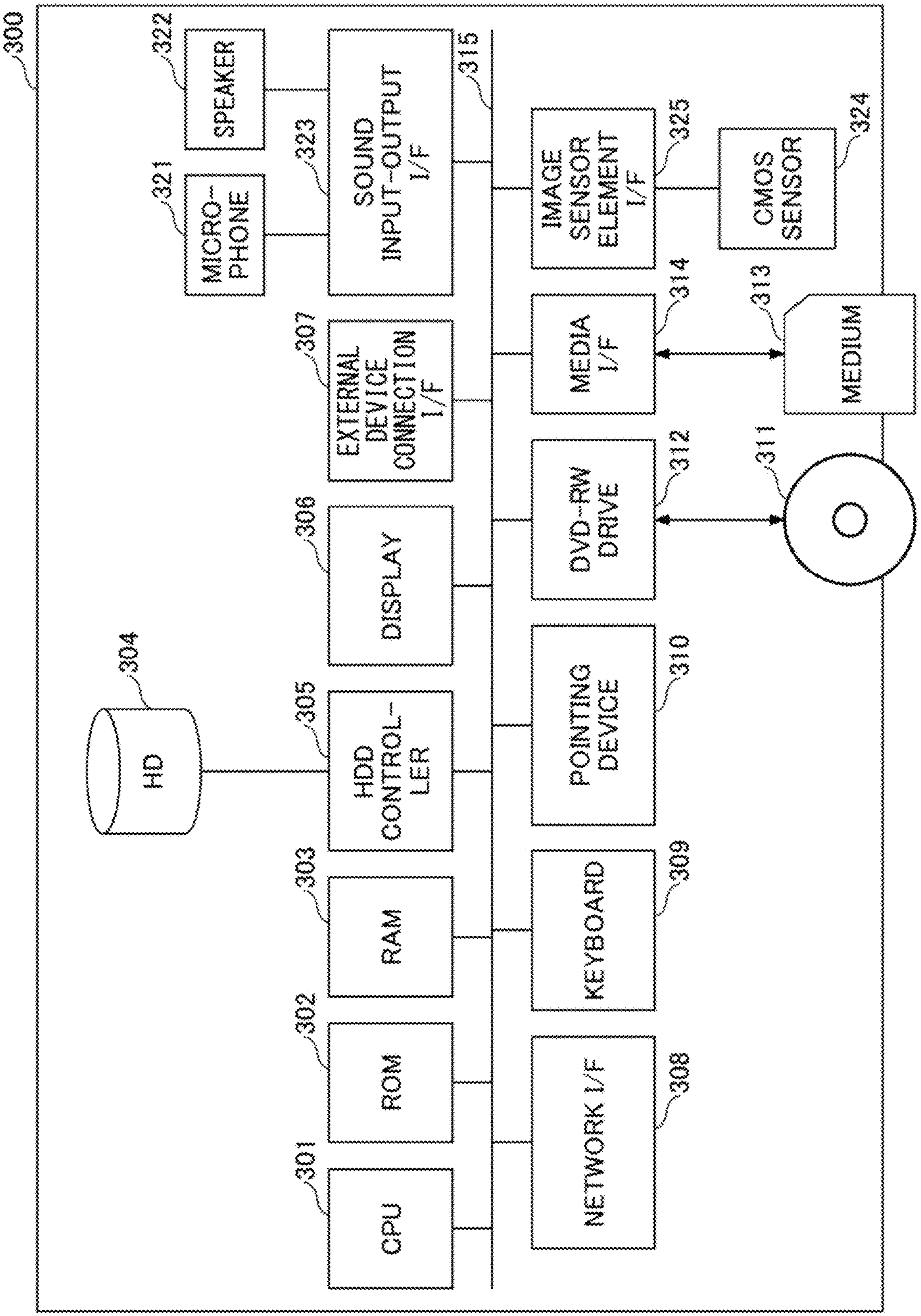
FIG. 3 is a diagram illustrating an example of a hardware configuration of a computer according to an embodiment.

The terminal device 100 may have a hardware configuration of a computer 300 as illustrated in FIG. 3, for example. The conference server 10 is implemented by, for example, one or more computers 300.

FIG. 3 is a diagram illustrating an example of a hardware configuration of a computer according to an embodiment. The computer 300 includes, for example, a central processing unit (CPU) 301, a read only memory (ROM) 302, a random access memory (RAM) 303, a hard disk (HD) 304, a hard disk drive (HDD) controller 305, a display 306, an external device connection interface (I/F) 307, a network I/F 308, a keyboard 309, a pointing device 310, a digital versatile disk rewritable (DVD-RW) drive 312, a media I/F 314, and a bus line 315, as illustrated in FIG. 3.

In a case where the computer 300 is the terminal device 100, the computer 300 further includes a microphone 321, a speaker 322, a sound input-output I/F 323, a complementary metal oxide semiconductor (CMOS) sensor 324, an image sensor element I/F 325, and the like.

Among these, the CPU 301 controls the operation of the entire computer 300. The ROM 302 stores a program used for starting the computer 300, such as an initial program loader (IPL). The RAM 303 is used as, for example, a work area of the CPU 301. The HD 304 stores programs such as an operating system (OS), applications, and device-drivers. The HDD controller 305 controls reading or writing of various kinds of data from or to the CPU 301 in accordance with control of the HD 304, for example.

The display 306 displays various kinds of information such as a cursor, a menu, a window, characters, and an image. The display 306 may be provided outside the computer 300. The external device connection I/F 307 is an interface for connecting various external devices to the computer 300. The network I/F 308 may be one or more in number. The network I/F 308 is an interface for connecting the computer 300 to the communication network 11 to communicate with other devices.

The keyboard 309 is a kind of an input unit having a plurality of keys for inputting characters, numerical values, various instructions, and the like. The pointing device 310 is a kind of an input unit for selecting and executing various instructions, selecting a processing target, moving a cursor, and the like. Note that the keyboard 309 and the pointing device 310 may be provided outside the computer 300.

The DVD-RW drive 312 controls reading and writing of various kinds of data from and to a DVD-RW 311 as an example of a removable recording medium. The DVD-RW is not limited to the DVD-RW, and other recording media may be used as the DVD-RW 311. The media I/F 314 controls reading or writing (storing) of data from or to the medium 313 such as a flash memory. The bus line 315 includes an address bus, a data bus, various control signals, and the like for electrically connecting the above-described components.

The microphone 321 is built-in circuitry that converts sound into an electric signal. The speaker 322 is built-in circuitry that generates sound such as music or voice by converting an electric signal into physical vibration. The sound input-output I/F 323 is circuitry that processes input and output of audio signals between the microphone 321 and the speaker 322 under the control of the CPU 301.

The CMOS sensor 324 is a kind of a built-in imaging unit that images a subject (e.g., a self-image) under the control of the CPU 301. The terminal device 100 may include an imaging unit such as a charge coupled device (CCD) sensor instead of the CMOS sensor 324. The image sensor element I/F 325 is circuitry that controls driving of the CMOS sensor 324.

(Example of Hardware Configuration of Terminal Device)

Here, an example of a hardware configuration of the terminal device 100 in a case where the terminal device 100 is an information terminal such as a smartphone or a tablet terminal will be described.

Figure 4:
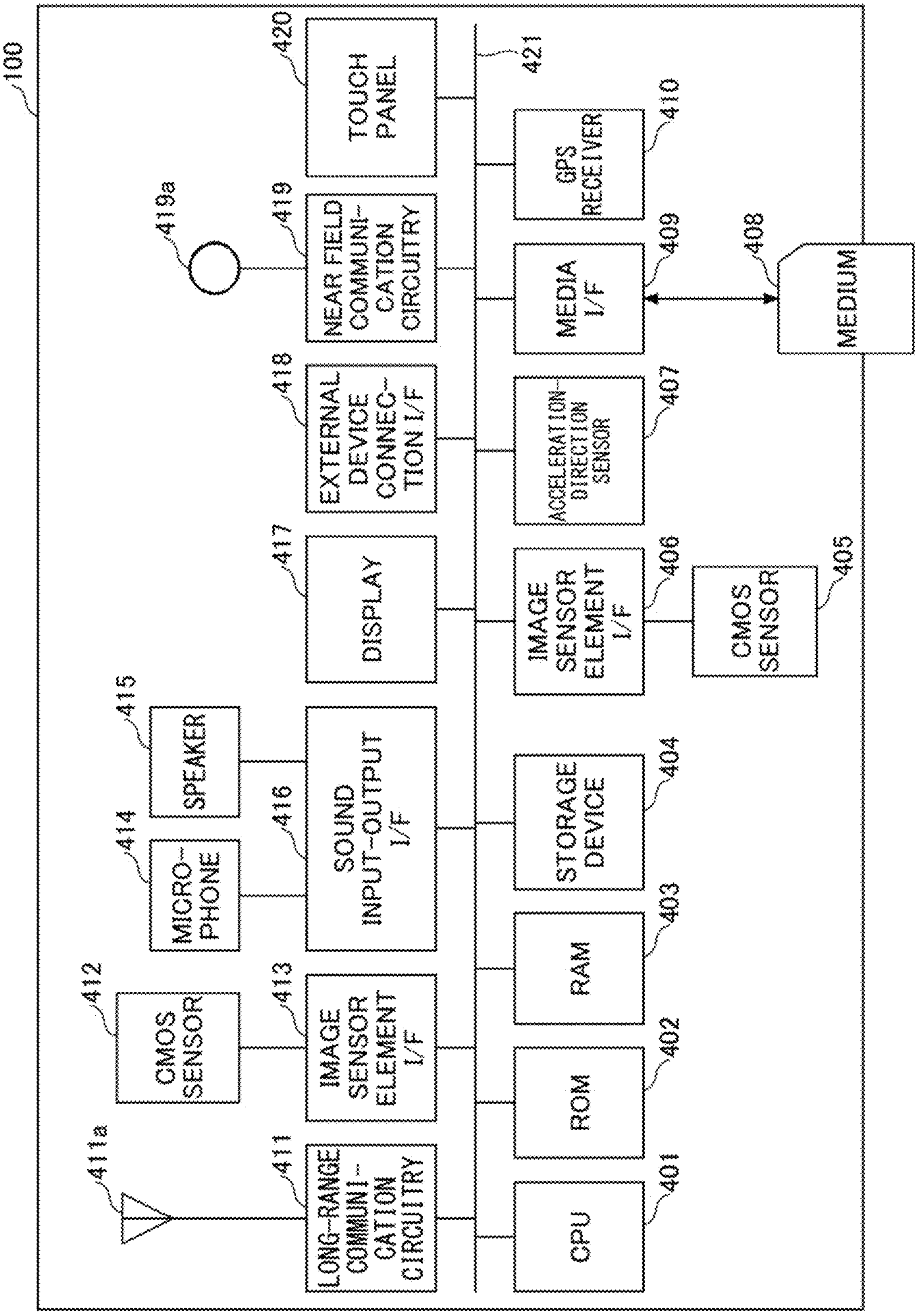
FIG. 4 is a diagram illustrating an example of a hardware configuration of a terminal device according to an embodiment.

FIG. 4 is a diagram illustrating an example of a hardware configuration of a terminal device according to an embodiment. In the example of FIG. 4, the terminal device 100 includes a CPU 401, a ROM 402, a RAM 403, a storage device 404, a CMOS sensor 405, an image sensor element I/F 406, an acceleration-direction sensor 407, a media I/F 409, and a global positioning system (GPS) receiver 410.

Among these, the CPU 401 executes a predetermined program to control the overall operation of the terminal device 100. The ROM 402 stores a program used for starting the CPU 401 such as an IPL. The RAM 403 is used as a work area of the CPU 401. The storage device 404 is a large-capacity storage device that stores programs such as an OS and applications, various types of data, and the like, and is implemented by, for example, a solid state drive (SSD), a flash ROM, or the like.

The CMOS sensor 405 is a kind of a built-in imaging unit that images a subject (mainly, a self-image) under the control of the CPU 401. The terminal device 100 may include an imaging unit such as a CCD sensor instead of the CMOS sensor 405. The image sensor element I/F 406 is circuitry that controls driving of the CMOS sensor 405. The acceleration-direction sensor 407 function as various sensors such as an electromagnetic compass, a gyrocompass, and an acceleration sensor that detect geomagnetism. The media I/F 409 controls reading or writing (storing) of data from or to a medium (storage medium) 408 such as a flash memory. The GPS receiver 410 receives a GPS-signal (positioning-signal) from a GPS satellite.

The terminal device 100 further includes a long-range communication circuitry 411, an antenna 411*a* of the long-range communication circuitry 411, a CMOS sensor 412, an image sensor element I/F 413, a microphone 414, a speaker 415, a sound input-output I/F 416, a display 417, an external device connection I/F 418, near field communication circuitry 419, an antenna 419*a* of the near field communication circuitry 419, and a touch panel 420.

The long-range communication circuitry 411 is circuitry that communicates with another device via the communication network 11, for example. The CMOS sensor 412 is a kind of a built-in imaging unit that images a subject under the control of the CPU 401. The image sensor element I/F 413 is circuitry that controls driving of the CMOS sensor 412. The microphone 414 is built-in circuitry that converts sound into an electric signal. The speaker 415 is built-in circuitry that generates sound such as music or voice by converting an electric signal into physical vibration. The sound input-output I/F 416 is circuitry that processes input and output of sound wave signals between the microphone 414 and the speaker 415 under the control of the CPU 401.

The display 417 is a kind of a display unit such as a liquid crystal display or an organic electro luminescent (EL) display that displays an image of a subject, various icons, and the like. The external device connection I/F 418 is an interface for connecting various external devices. The near field communication circuitry 419 includes circuitry for performing near field wireless communication. The touch panel 420 is a kind of an input unit for operating the terminal device 100 when the user presses the display 417.

The terminal device 100 further includes a bus line 421. The bus line 421 includes an address bus, a data bus, and the like for electrically connecting the respective components such as the CPU 401 illustrated in FIG. 4.

(Another Example of Hardware Configuration of Terminal Device)

Figure 5:
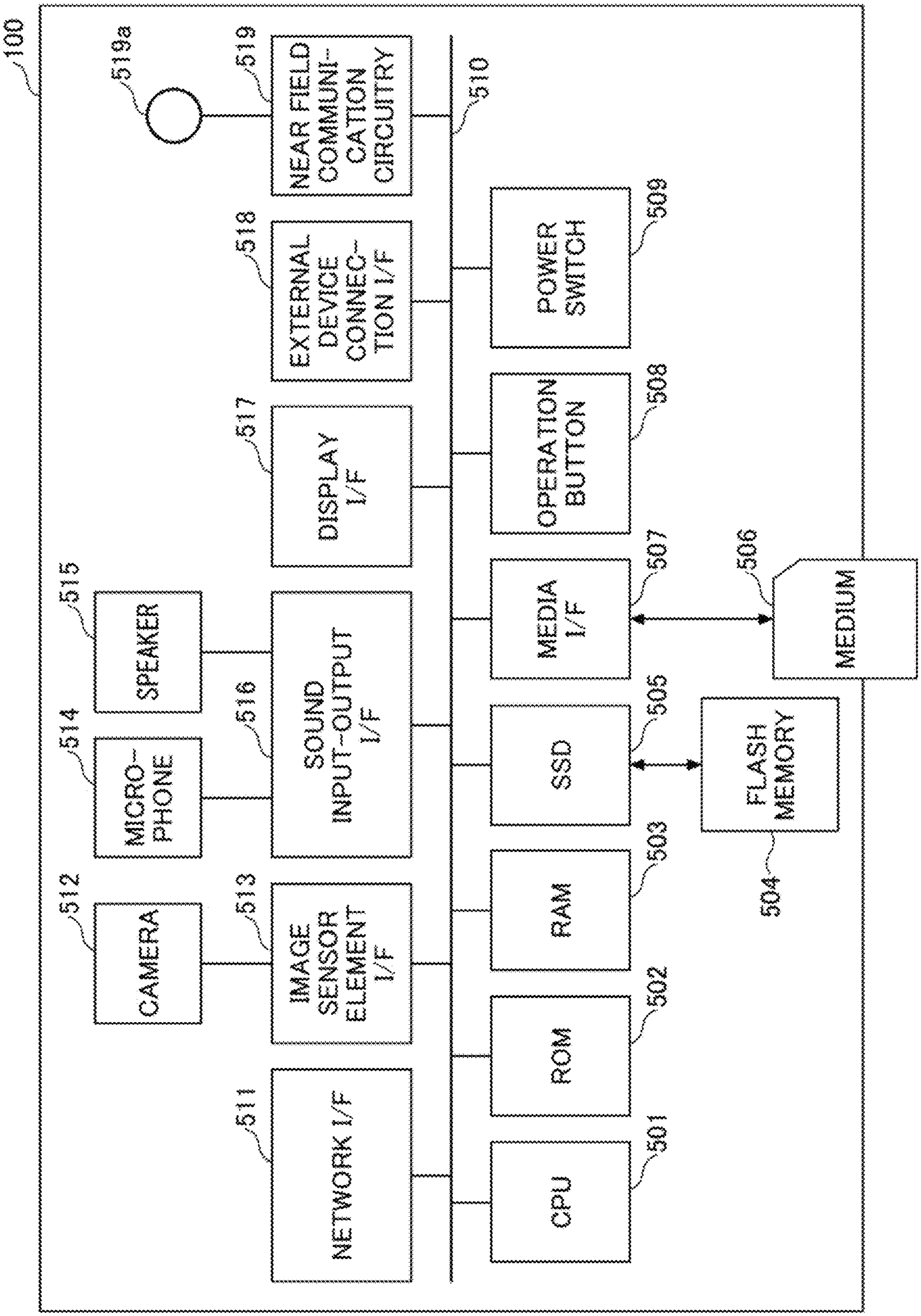
FIG. 5 is a diagram illustrating another example of the hardware configuration of the terminal device according to an embodiment.

FIG. 5 is a diagram illustrating another example of a hardware configuration of a terminal device according to the embodiment. Here, an example of a hardware configuration of the terminal device 100 in a case where the terminal device 100 is a video conference terminal will be described.

The terminal device (video conference terminal) 100 has a configuration of a computer, which includes a CPU 501, a ROM 502, a RAM 503, a flash memory 504, and an SSD 505. The terminal device 100 further includes a media I/F 507, an operation button 508, a power switch 509, a network I/F 511, a camera 512, an image sensor element I/F 513, a microphone 514, a speaker 515, and a sound input-output I/F 516. The terminal device (video conference terminal) 100 further includes a display I/F 517, an external device connection I/F 518, a near field communication circuitry 519, an antenna 519*a* for the near field communication circuitry 519, and a bus line 510.

The CPU 501 is an arithmetic-logic device that reads a program from the ROM 502 or the flash memory 504 and executes the program to implement each function of the terminal devices 100. The ROM 502 is, for example, a nonvolatile memory that stores in advance a program used for activation of the CPU 501 such as an IPL. The RAM 503 is a volatile memory used as a work area of the CPU 301.

The flash memory 504 is a storage device that stores, for example, an OS, an application program, and various data. The SSD 505 controls reading and writing of various kinds of data from and to the flash memory 504 under the control of the CPU 501. The media I/F 507 controls reading or writing (storing) of data from or to the medium 506 such as a memory card.

The operation button 508 is an input device that receives an input operation of a user of the terminal device (video conference terminal) 100. The power switch 509 is a switch for switching on/off of the power of the terminal device (video conference terminal) 100. The network I/F 511 is a communication interface for performing communication using the communication network 11.

The camera 512 is an imaging device for imaging a subject under the control of the CPU 501. The image sensor element I/F 513 controls the image capturing by the camera 512 and converts the captured image into a predetermined image data (video data). The microphone 514 converts the acquired sound into an electric signal. The speaker 515 converts the sound signal into sound and outputs the sound. The sound input-output I/F 516 controls input and output of sound by the microphone 514 and the speaker 515.

The display I/F 517 outputs an image to a display device such as a display connected to the display I/F 517 under the control of the CPU 501. The external device connection I/F 518 is an interface for connecting various external devices. The near field communication circuitry 519 is communication circuitry that performs near field wireless communication via the antenna 519*a*. The bus line 510 is commonly connected to the above-described components and transmits an address signal, a data signal, various control signals, and the like. The medium 506 includes, for example, a storage media such as various memory cards. The medium 506 is configured to be removable from the terminal device 100.

Note that, when the terminal device 100 is an electronic whiteboard, the terminal device 100 includes, for example, a large-sized display, a touch sensor, and the like in addition to the hardware configuration illustrated in FIG. 5.

<Functional Configuration>

(Functional Configuration of Terminal Device)

Figure 6:
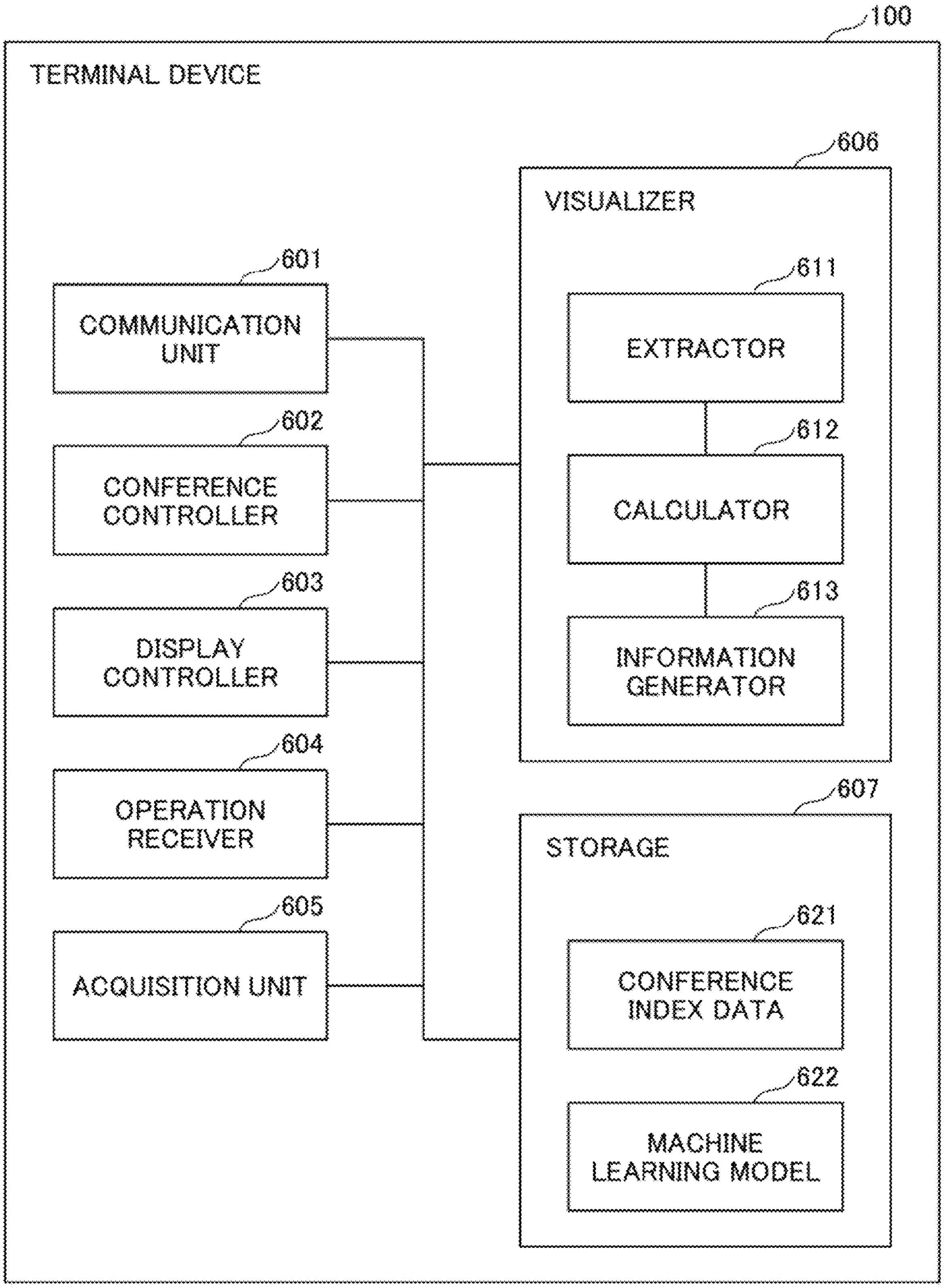
FIG. 6 is a diagram illustrating an example of a functional configuration of a terminal device according to an embodiment.

FIG. 6 is a diagram illustrating an example of a functional configuration of a terminal device according to an embodiment. For ease of explanation, the following description will be given on the assumption that the terminal device 100 has the hardware configuration of the computer 300 as illustrated in FIG. 3.

A communication unit 601, a conference controller 602, a display controller 603, an operation receiver 604, an acquisition unit 605, a visualizer 606, and a storage 607 of the terminal device (information processing device) 100 are implemented by executing a predetermined program stored in a storage medium such as a HD 304. At least some of the functional configurations may be implemented by hardware.

The communication unit 601 connects the terminal devices 100 to the communication network 11 using, for example, the network I/F 308, and performs communication processing for communicating with the conference server 10, other terminal devices 100, or the like.

The conference controller 602 executes a series of processes related to the web conference, such as connection to the web conference, transmission and reception of audio and images, and input and output of audio and images. The processing executed by the conference controller 602 may be the same as processing of a general web conference. The web conference is an example of communication according to the present embodiment, and may be other communication such as a lecture, counseling, or remote medical care.

The display controller 603 executes display control processing for displaying a display screen on a display unit such as the display 306 under the control of the conference controller 602, the visualizer 606, or the like. The operation receiver 604 executes operation receiving processing for receiving an operation by a participant using an input device such as the keyboard 309 or the pointing device 310.

The acquisition unit 605 executes acquisition processing of acquiring a voice utterance made by a participant participating in a web conference (an example of communication) and a voice utterance made by another participant participating in the web conference from, for example, the conference controller 602 or the like. The acquisition unit 605 may acquire the voice of the participant participating in the web conference and the voice of the other participant from, for example, the sound input-output I/F 323.

The visualizer 606 executes visualization processing for visualizing the situation of the web conference based on the utterance time of the participant participating in the web conference and the utterance time of the other participant participating in the web conference. Preferably, the visualizer 606 visualizes the situation of the web conference, based further on the number of uttered characters of the participant and the number of uttered characters of the other participant. The visualizer 606 includes, for example, an extractor 611, a calculator 612, and an information generator 613.

The extractor 611 extracts the utterance time and the number of uttered characters (or the number of uttered words) of the participant and the utterance time and the number of uttered characters (or the number of uttered words) of the other participant from the voices acquired by the acquisition unit 605. For example, the extractor 611 converts an utterance content of the participant into text using a known voice recognition technique, analyzes the text-converted utterance, and extracts the utterance time and the number of characters of the utterance of the participant. Similarly, the extractor 611 converts an utterance content of the other participant into text using a known voice recognition technique, analyzes the text-converted utterance, and extracts the utterance time and the number of characters of the utterance of the other participant. The extractor 611 may acquire the number of uttered words instead of the number of uttered characters according to the characteristics of the language.

The calculator 612 calculates an index for visualizing the web conference (communication), based on the utterance time and the number of uttered characters of the participant and the utterance time and the number of uttered characters of the other participant extracted by the extractor 611. For example, the calculator 612 calculates “initiative”, “seriousness”, and “superiority” described above in FIG. 2, and outputs the results to the information generator 613.

The “initiative” is a first index for visualizing communication such as a web conference, based on a ratio of an utterance time of the other participant to an utterance time of the participant. For example, the calculator 612 calculates the “initiative” (utterance ratio) by dividing the utterance time of the other participant in the web conference by the utterance time of the participant.

In the web conference, a person who makes a large number of utterances is considered to have high presence in the web conference and to give an impression that the person leads the web conference. For example, when the utterance ratio is close to 1.0 (e.g., the participant 0.5, the other participant 0.5), it is determined that the participant and the other participant are uttering on an equal basis and they have an equal initiative in the web conference. On the other hand, when the utterance ratio is close to 0.5 (e.g., the participant 0.7, a subordinate 0.3, etc.), it is determined that the participant is talking one-sidedly and the utterance of the participant is the main subject of the web conference (the participant has the initiative). When the utterance ratio exceeds 1.0 (e.g., the participant 0.2, the subordinate 0.8, etc.), it can be determined that the other participant is talking one-sidedly in the web conference, and the utterance of the other participant is the main subject of the web conference (the other participant has the initiative).

The “seriousness” is a second index for visualizing communication such as a web conference, based on a ratio of an utterance speed of the other participant to an utterance speed of a participant. For example, the calculator 612 calculates the “seriousness” (utterance speed ratio) by dividing the utterance speed (the number of uttered characters/utterance time) of the other participant in the web conference by the utterance speed (the number of uttered characters/utterance time) of the participant.

The high utterance speed indicates that a user is speaking with a great deal of energy (talking fast in a furious manner). Therefore, when the participant speaks faster, the other participants may feel seriousness (or oppression) from the participant. On the other hand, when the other participant speaks earlier, the participant may feel seriousness (or a sense of oppression) from the other participant. For example, when the utterance speed ratio is close to 1.0 (e.g., the participant 0.5 and the other participant 0.5), it can be determined that the participant and the other participant are conversing with equal emotions. On the other hand, when the utterance speed ratio is close to 0.5 (e.g., participant 0.7, subordinate 0.3, etc.), the utterance speed of the participant is faster, and thus it is determined that the other participants feel seriousness (or oppression) from the participant. When the utterance speed ratio exceeds 1.0 (e.g., the participant 0.2, the other participant 0.8, etc.), the utterance speed of the other participant is faster, and thus it is determined that the participant feels seriousness (or oppression) from the other participant.

The “superiority” is a third index for visualizing communication such as a web conference, based on a ratio of the longest utterance time for which the other participant continuously utters to the longest utterance time for which the participant continuously utters. For example, the calculator 612 calculates the “superiority” (the longest utterance time ratio) by dividing the longest utterance time of the other participant in the web conference by the longest utterance time of the participant.

In the web conference, when two speakers utter in equal proportions, and one of the speakers continuously utters for a certain period, the speaker who continuously utters for a certain period gives an impression of having superiority in the web conference (in a bad sense, the speaker does not give the other speaker an opportunity to speak). For example, when the longest utterance time ratio is close to 1.0 (e.g., the participant 0.5, the other participant 0.5), it is determined that the two speakers speak for a long time at an equal ratio. On the other hand, when the longest utterance time ratio is close to 0.5 (e.g., the participant 0.7, the other participant 0.3, etc.), it is determined that the participant continues to utter for a longer time in one conversation and that the participant’s utterance has affected the web conference. When the longest utterance time ratio exceeds 1.0 (e.g., the participant 0.2, the other participant 0.8, etc.), it is determined that the other participant continues to utter for a longer time in one conversation and that the other participant’s utterance has affected the web conference.

The information generator 613 generates information for visualizing a situation of the conference, based on one or more indexes calculated and output by the calculator 612. As an example, the information generator 613 generates a display screen 210 as illustrated in FIG. 2. For example, the information generator 613 generates the index 220 for visualizing the meeting (business negotiation) described in FIG. 2 using “initiative”, “seriousness”, and “superiority” output by the calculator 612. The information generator 613 may generate the communication guide 230 (e.g., “Let’s ask about a situation of the company of the customer”, or the like) for making the “superiority” ratio (proportion) output by the calculator 612 closer to the target “superiority” ratio.

The visualizer 606 displays (outputs), for example, a display screen 210 as illustrated in FIG. 2, which is generated by the information generator 613, on a display unit such as the display 306, by using the display controller 603. However, the display screen 210 illustrated in FIG. 2 is an example of information for visualizing the conference output by the visualizer 606.

The storage 607 is implemented by, for example, a program executed by a CPU 301 and storage devices such as a HD 304, and stores various information such as a conference index data 621 or a machine learning model. The conference index data 621 and the machine learning model will be described later.

The functional configuration of the terminal device 100 illustrated in FIG. 6 is an example. For example, as illustrated in FIG. 7, the acquisition unit 605, the visualizer 606, the storage 607, and the like may be included in the conference server 10.

Figure 7:
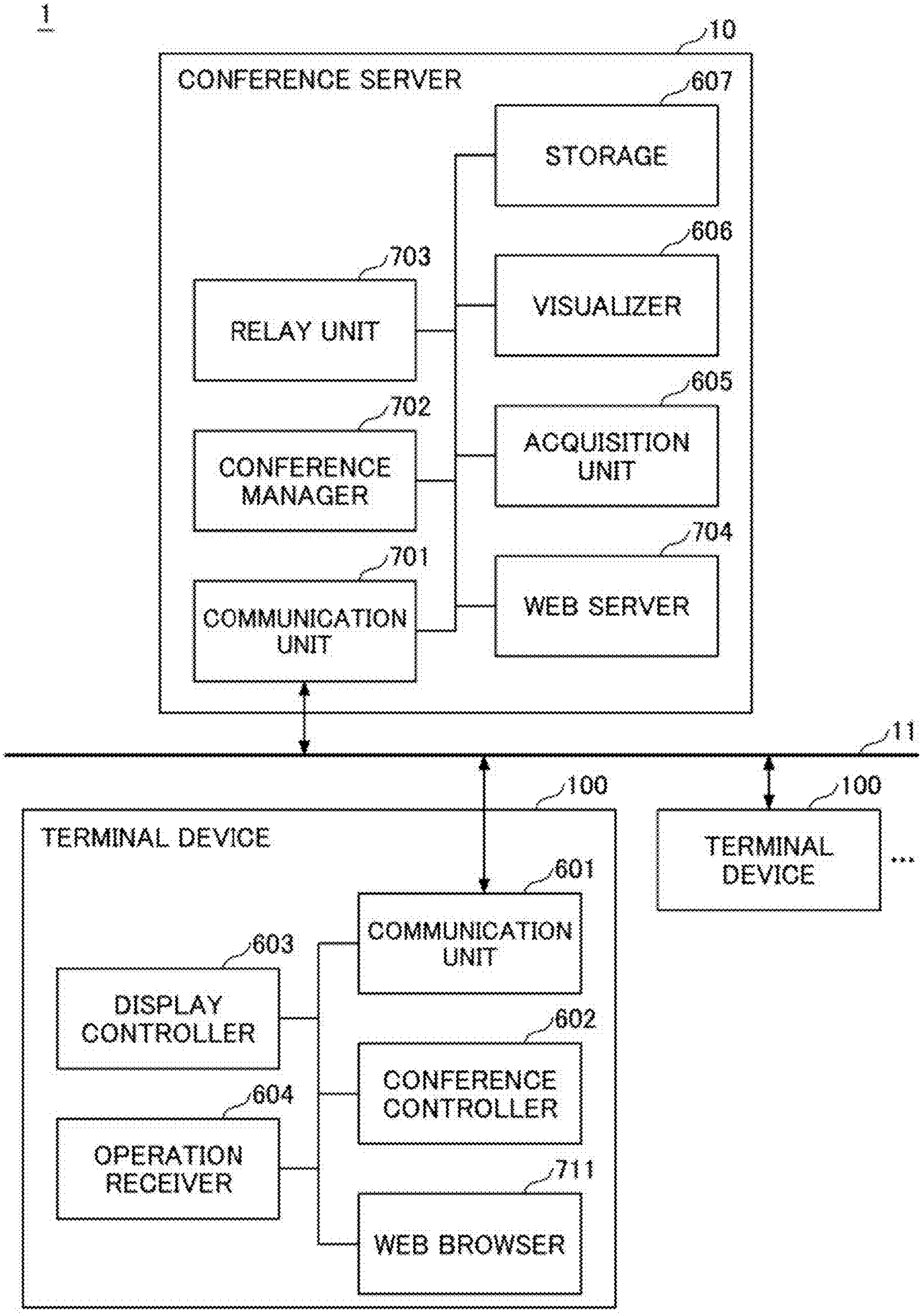
FIG. 7 is a diagram illustrating an example of a functional configuration of a communication support system according to an embodiment.

FIG. 7 is a diagram illustrating an example of a functional configuration of a communication support system according to an embodiment. This figure illustrates an example of a functional configuration of the communication support system 1 in a case where the conference server 10 includes the acquisition unit 605, the visualizer 606, the storage 607, and the like described above.

(Functional Configuration of Conference Server)

The conference server (another example of the information processing device) 10 executes a predetermined program on one or more computers 300 to implement a communication unit 701, a conference manager 702, a relay unit 703, a web server 704, an acquisition unit 605, a visualizer 606, a storage 607, and the like. At least some of the functional configurations may be implemented by hardware.

The communication unit 601 connects the conference server 10 to the communication network 11 using, for example, the network I/F 308 of the computer 300, and executes communication processing for communicating with the plurality of terminal devices 100.

The conference manager 702 executes conference management processing of causing the plurality of terminal devices 100 that access a uniform resource locator (URL) for the same web conference to participate in the same web conference (session).

The relay unit 703 executes relay processing for relaying content including audio and images between a plurality of terminal devices 100 participating in the same web conference. The functions of the conference manager 702 and the relay unit 703 may be the same as those of an existing web conference system.

The web server 704 functions as a web server that provides a web page or the like for visualizing a web conference managed by the conference manager 702.

The acquisition unit 605 executes acquisition processing of acquiring, for example, a voice utterance made, in the web conference, by the participant who has accessed the web server 704 and a voice utterance made by the other participant who participates in the web conference from, for example, the relay unit 703 or the like.

The visualizer 606 executes visualization processing for visualizing a situation of the web conference based on the utterance time and the number of uttered characters of the participant participating in the web conference and the utterance time and the number of uttered characters of the other participant participating in the web conference. The visualization processing executed by the visualizer 606 is the same as the visualization processing executed by the visualizer 606 included in the terminal device 100 described with reference to FIG. 6. However, the visualizer 606 included in the conference server 10 transmits (outputs) a display screen for visualizing the conference to the web browser 711 or the like of the terminal device 100 via the web server 704.

The storage 607 stores various information such as conference index data 621 and the machine learning model. The conference index data 621 and a machine learning model will be described later.

(Functional Configuration of Terminal Device)

The terminal device 100 illustrated in FIG. 7 includes a web browser 711, instead of the acquisition unit 605, the visualizer 606, and the storage 607 included in the terminal device 100 described with reference to FIG. 6.

The web browser 711 is implemented by, for example, a web browser executed by CPU 301 or an application having a web browser function. The web browser 711 accesses the web server 704 of the conference server 10 in accordance with an operation of a participant who uses the terminal device 100, and displays a web page or the like that visualizes a web conference and is provided by the web server 704. Note that the functional configuration of the terminal device 100 other than the web browser 711 may be the same as the functional configuration described with reference to FIG. 6.

Figure 8:
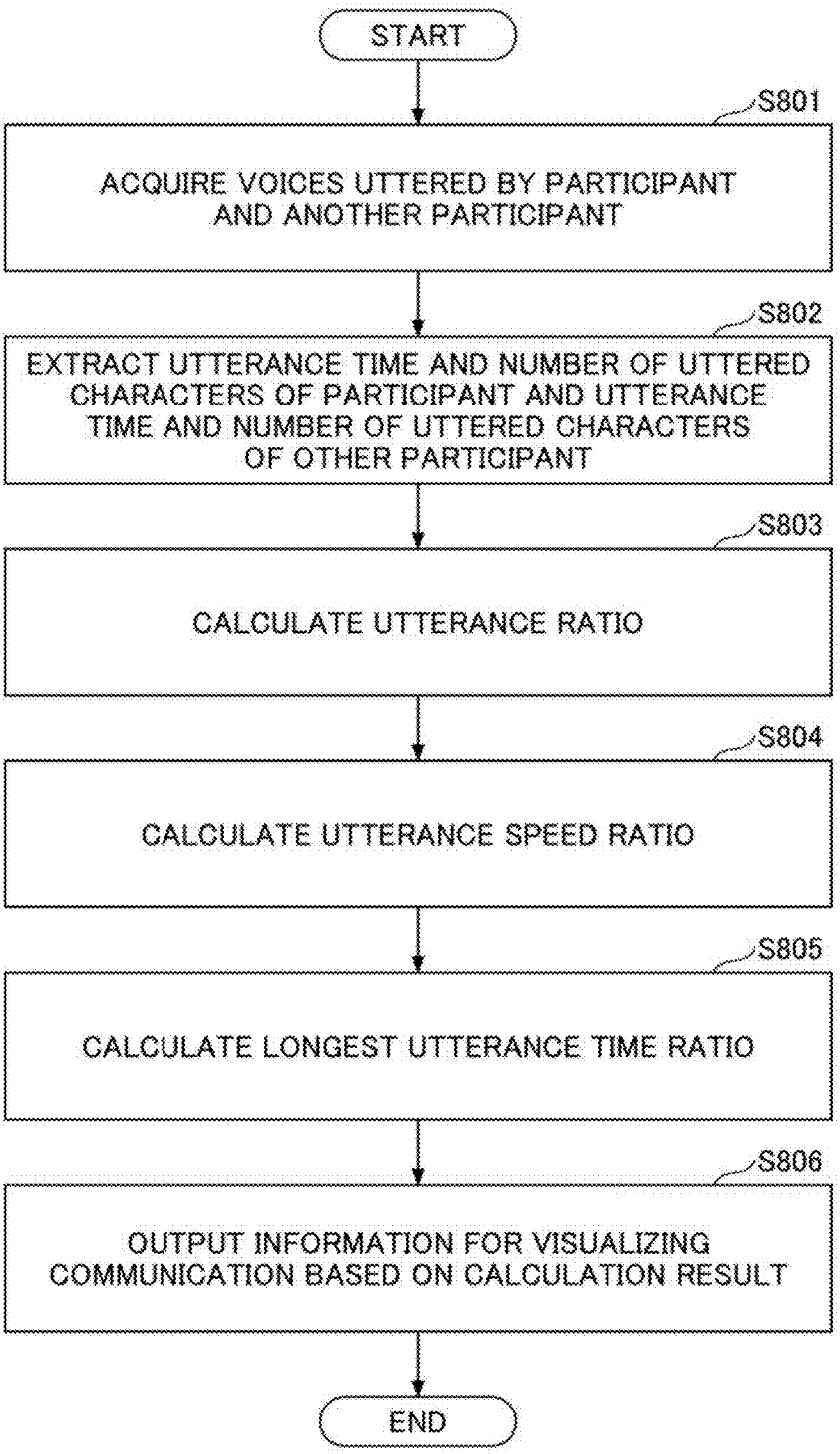
FIG. 8 is a flowchart illustrating an example of communication support processing according to an embodiment.

The functional configuration of the communication support system 1 illustrated in FIG. 8 is an example. For example, the conference server 10 may be divided into a first server that provides a web conference service and a second server that provides a web page or the like for visualizing a web conference. The first server that provides the web conference service may be further divided into a third server that executes the conference management processing and a fourth server that executes the relay process. Furthermore, the acquisition unit 605 included in the conference server 10 may be included in the terminal device 100 and transmit the audio acquired from the conference controller 602 to the conference server 10.

In short, each functional configuration of the communication support system 1 illustrated in FIG. 7 may be included in any device included in the communication support system 1.

<Processing Flow>

Next, a processing flow of the communication support method according to the present embodiment will be described.

(Communication Support Processing)

FIG. 8 is a flowchart illustrating an example of communication support processing according to the embodiment. This processing illustrates an outline of communication support processing executed by the terminal device 100 illustrated in FIG. 6 or the communication support system 1 illustrated in FIG. 7, for example. At the start of the processing illustrated in FIG. 8, the terminal device 100 used by the participant and the terminal device 100 used by the other participant are participating in the same web conference, and are in a state in which content including audio and images can be transmitted and received.

In step S801, the acquisition unit 605 acquires a voice utterance made by a participant participating in a web conference (an example of communication) and a voice utterance made by the other participant participating in the web conference.

In step S802, the extractor 611 extracts the utterance time and the number of uttered characters (or the number of uttered words) of the participant and the utterance time and the number of uttered characters (or the number of uttered words) of the other participant from the voices acquired by the acquisition unit 605.

In step S803, the calculator 612 calculates an utterance ratio which is a ratio of the utterance time of the other participant to the utterance time of the participant.

In step S804, the calculator 612 calculates an utterance speed ratio which is a ratio of the utterance speed of the other participant to the utterance speed of the participant.

In step S805, the calculator 612 calculates a longest utterance time ratio which is a ratio of the longest utterance time for which the other participant continuously utters to the longest utterance time for which the participant continuously utters.

In step S806, the visualizer 606 executes visualization processing of generating information for visualizing the web conference by using the information generator 613 and the calculation result calculated by the calculator 612, and outputting the generated information.

(Visualization Processing)

First Embodiment

Figure 9A:
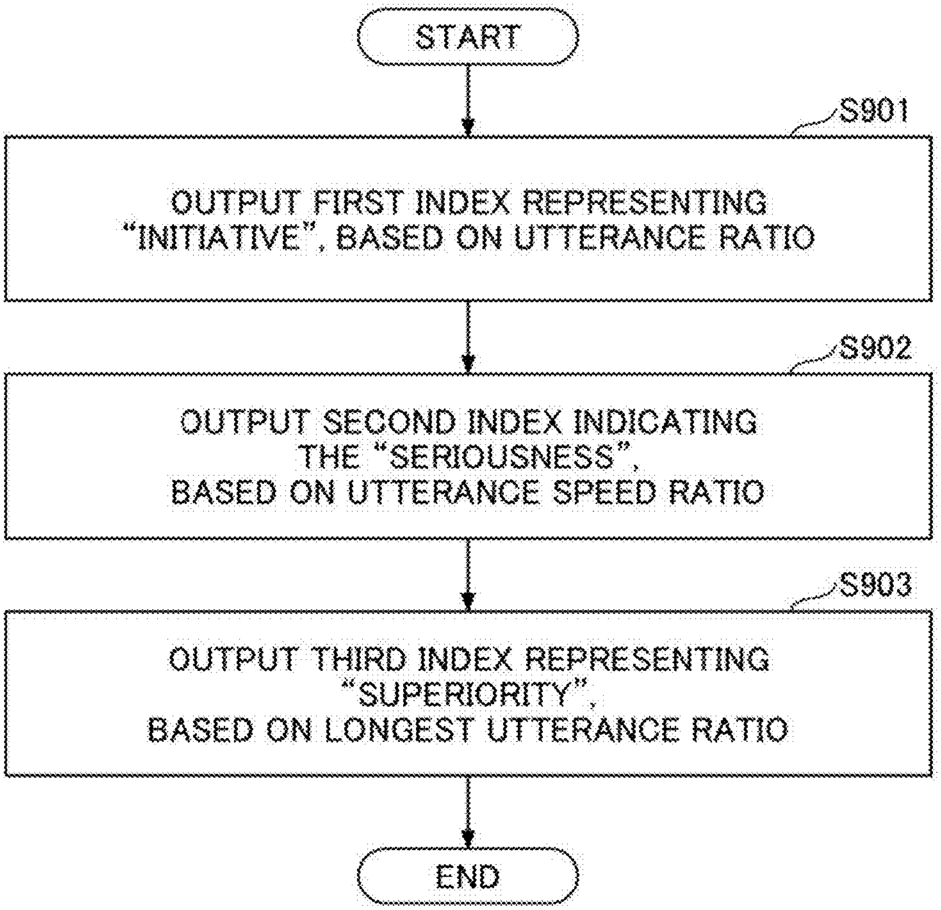
FIG. 9A is a flowchart (1) illustrating an example of visualization processing according to a first embodiment.
Figure 9B:
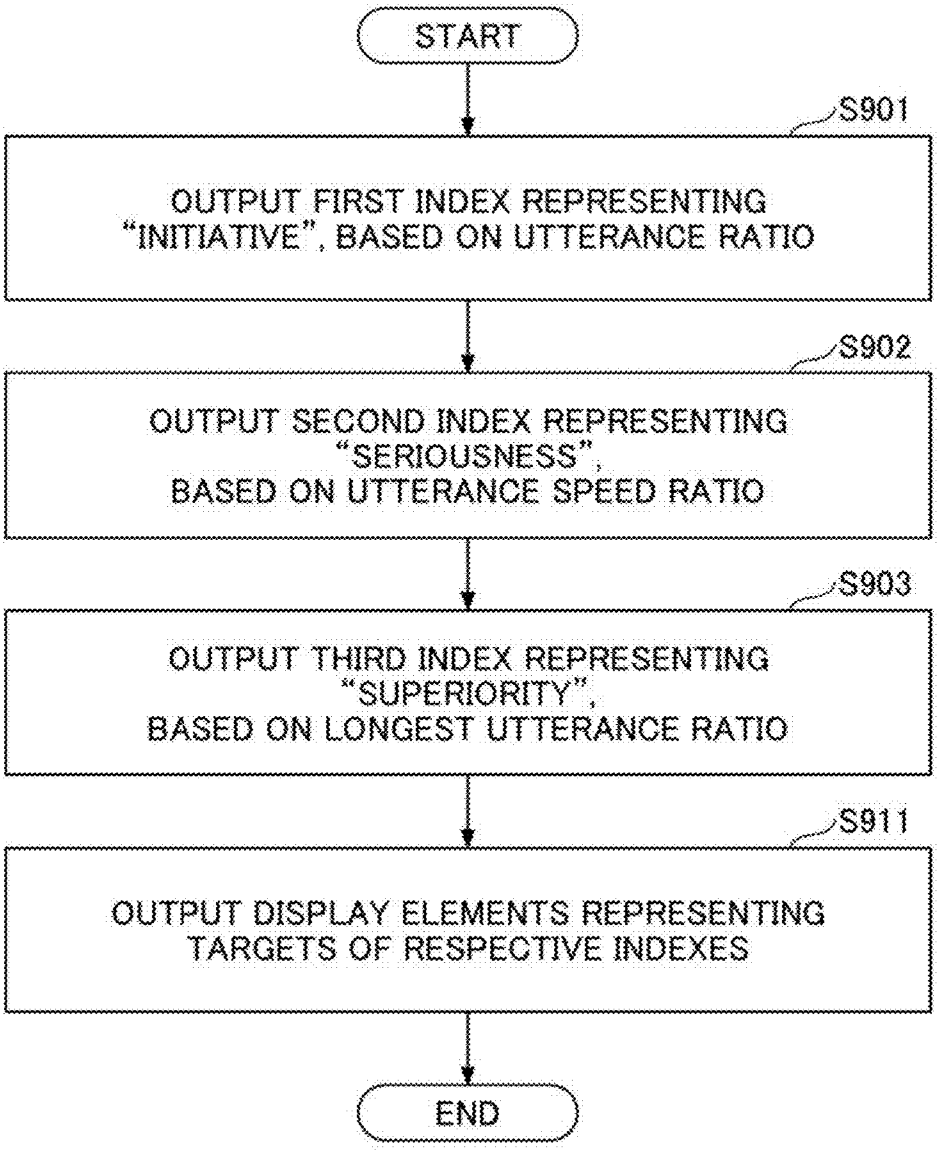
FIG. 9B is a flowchart (2) illustrating an example of visualization processing according to the first embodiment.

FIGS. 9A and 9B are flowcharts illustrating an example of visualization processing according to the first embodiment.

FIG. 9A illustrates an example of the visualization processing executed by the visualizer 606 in step 806 of FIG. 8.

In step S901, the visualizer 606 generates a first index representing "initiative" of the conference, based on the utterance ratio calculated by the calculator 612, and outputs the generated first index, by using the information generator 613. As an example, the visualizer 606 displays (outputs) a display element "Initiative 221" representing "initiative" by the utterance ratio of the utterance time of the other participant to the utterance time of the participant on the display screen 210 as illustrated in FIG. 2.

In step S902, the visualizer 606 generates a second index indicating the "seriousness" of the conference, based on the utterance speed ratio calculated by the calculator 612, and outputs the generated second index, by using the information generator 613. As an example, the visualizer 606 displays (outputs) a display element "seriousness 223" representing "seriousness" by the utterance speed ratio of the utterance speed of the other participant to the utterance speed of the participant on the display screen 210 as illustrated in FIG. 2.

In step S903, the visualizer 606 generates a third index representing "superiority" of the conference, based on the longest utterance ratio calculated by the calculator 612, and outputs the generated third index, by using the information generator 613. As an example, the visualizer 606 displays (outputs) a display element "superiority 222" representing "superiority" by a ratio of the longest utterance time for which the other participant continuously utters to the longest utterance time for which the participant continuously utters on the display screen 210 as illustrated in FIG. 2.

FIG. 9B illustrates another example of the visualization processing executed by the visualizer 606 in step 806 of FIG. 8. In the visualization processing illustrated in FIG. 9B, processing of step S911 is added after the processing of steps S901 to S903 described in FIG. 9A.

In step S911, the visualizer 606 outputs display elements representing the targets of the indexes. For example, the visualizer 606 displays a display component 221*c* indicating a target initiative ratio (proportion) on a display screen 210 as illustrated in FIG. 2. The target initiative ratio may be stored in advance in the conference index data 621 of the storage 607, or may be set by the participant who uses the terminal device 100 on a setting screen or the like.

Similarly, the visualizer 606 displays a display element indicating a target superiority ratio, a display element indicating a target seriousness ratio, and the like on the display screen 210. This makes it easy for the participant to adjust the content of his/her utterance so as to approach the target ratio of each index.

According to the first embodiment, the communication support system 1 can provide the participant with the index 220 or the like for visualizing the conference (business negotiation) by the display screen 210 as illustrated in FIG. 2, for example.

Second Embodiment

Figure 10:
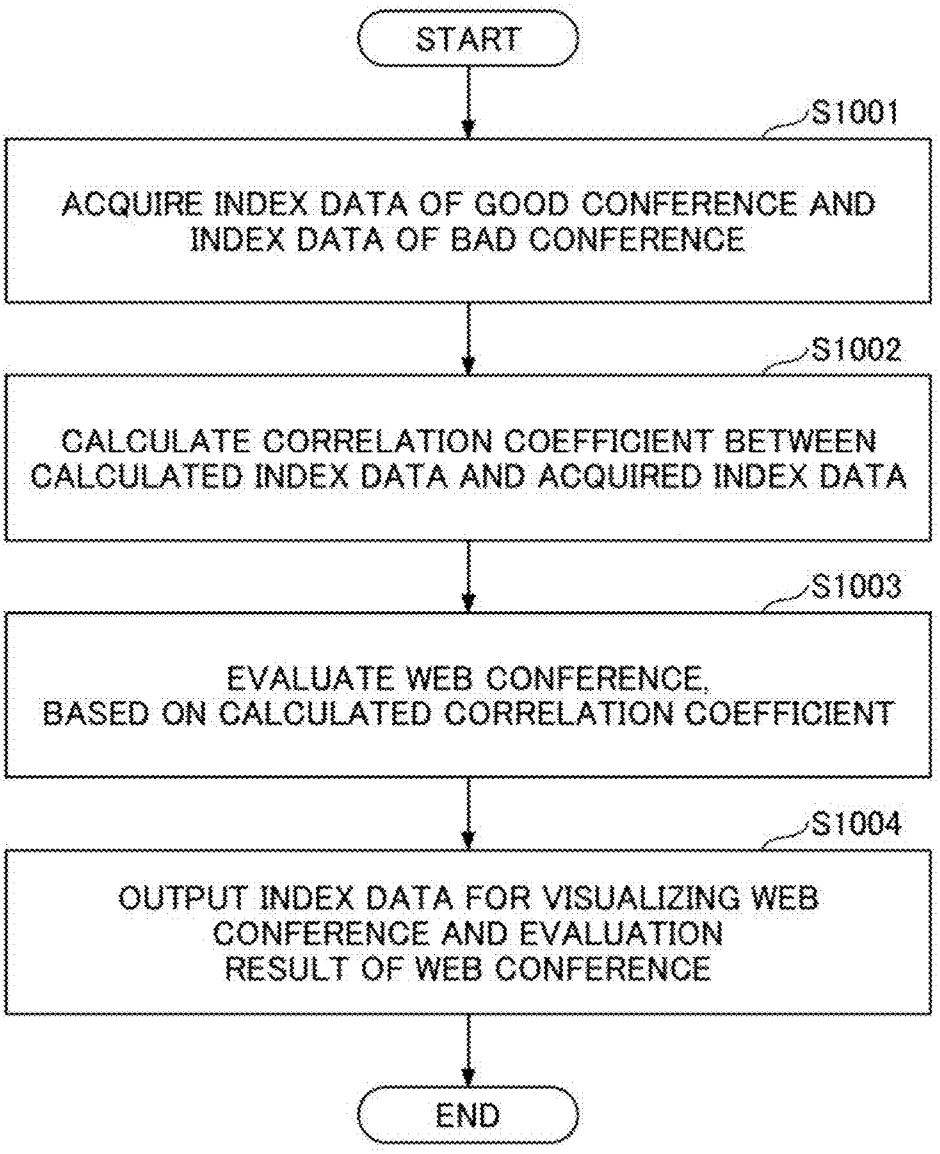
FIG. 10 is a flowchart illustrating an example of visualization processing according to a second embodiment.

FIG. 10 is a flowchart illustrating an example of visualization processing according to a second embodiment. This processing is another example of the visualization processing executed by the visualizer 606 in step S806 of FIG. 8.

In step S1001, the information generator 613 acquires the index data of a good conference and the index data of the bad conference from the conference index data 621 stored in advance in the storage 607, for example. The index data of a good conference may be, for example, index ("initiative", "seriousness", and "superiority") data extracted from a sample of the good conference in which an actor performed, or may be index data extracted from a conference (business negotiation) in which a good result is previously obtained. Similarly, index data of a bad conference may be, for example, index data extracted from a sample of the bad conference in which an actor performed, or index data extracted from a conference (business negotiation) that previously had a bad result.

In step S1002, the information generator 613 calculates, for example, a correlation coefficient indicating a correlation between the index data calculated in steps S803 to S805 of FIG. 8 and the index data acquired in step S1001.

FIG. 11 is a diagram illustrating calculation of a correlation coefficient of index data according to the second embodiment. In FIG. 11, index data 1101 of the good conference and index data 1102 of the bad conference are examples of the index data acquired by the information generator 613 in step S1101. The calculation data 1103 is an example of the index data calculated in steps S803 to S805 in FIG. 8.

In the example of FIG. 11, the information generator 613 calculates a correlation coefficient (e.g., the Pearson correlation coefficient) between each index of the calculation data 1103 and each index of the usage scenarios 1 to 3 included in the index data 1101 of the good conference, and calculates an average 1104 of the calculated correlation coefficients. The information generator 613 sets the average 1104 of the calculated correlation coefficients as a correlation coefficient indicating a correlation between the calculated index data and the index data of the good conference.

Similarly, the information generator 613 calculates a correlation coefficient between each index of the calculation data 1103 and each index of the usage scenarios 1 to 3 included in the index data 1102 of the bad conference, and calculates an average 1105 of the calculated correlation coefficients. The information generator 613 sets the average 1105 of the calculated correlation coefficients as a correlation coefficient indicating a correlation between the calculated index data and the index data of the bad conference.

As another example, in step S1101, the information generator 613 may display a plurality of usage scenarios 1 to 3 on the terminal devices 100 in a selectable manner, and acquire the index data of the good conference and the index data of the bad conference corresponding to the usage scenario selected by the participant. In this case, the information generator 613 calculates, in step S1102, a correlation coefficient between each of the indexes of the calculation data 1103 and the index data of the good conference in the usage scenario selected by the participant. Similarly, in step S1102, the information generator 613 calculates a correlation coefficient between each of the indexes of the calculation data 1103 and the index data of the bad conference in the usage scenario selected by the participant.

In step S1003, the information generator 613 evaluates the web conference, based on the correlation coefficient calculated in step S1002. For example, in the example of FIG. 11, the average 1104 of the correlation coefficients between the calculation data 1103 and the index data 1101 of the good conference is "0.70", and the average 1105 of the correlation coefficients between the calculation data 1311 and the index data 1102 of the bad conference is "0.39". In this case, the information generator 613 may evaluate the current web conference as a good conference because the correlation coefficient with the good conference is larger.

As another example, the information generator 613 may set the average "0.79" of the correlations between the calculation data 1103 and the index data 1101 of the good conference as the evaluation result (e.g., the satisfaction level) of the web conference. Alternatively, the information generator 613 may calculate the evaluation result of the web conference using a correlation coefficient with a good conference and a correlation coefficient with a bad conference.

Figure 12:
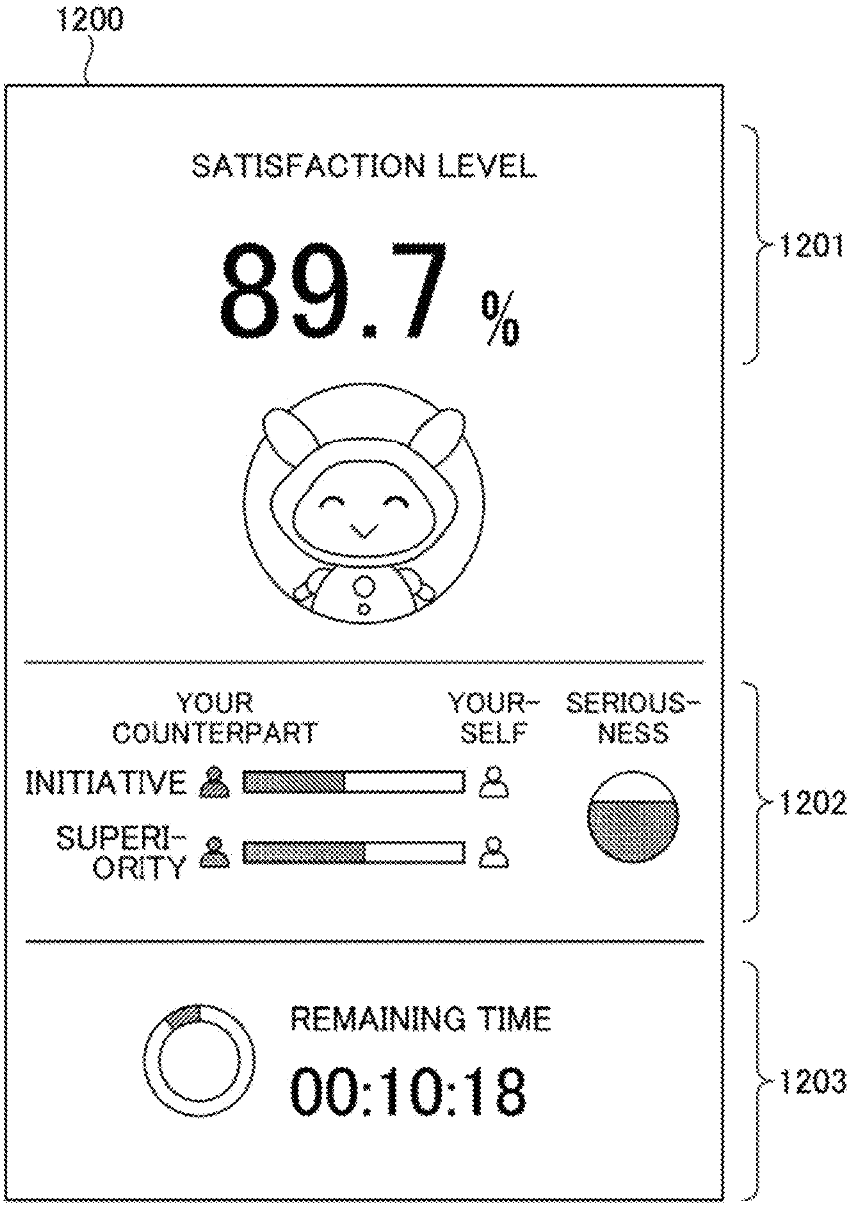
FIG. 12 is a diagram illustrating an example of a display screen according to the second embodiment.

In step S1004, the visualizer 606 outputs the index data ("initiative", "superiority", and "seriousness") for visualizing the web conference and the evaluation result of the web conference. For example, the information generator 613 generates a display screen 1200 as illustrated in FIG. 12, for example, which includes the index data ("initiative", "superiority", and "seriousness") for visualizing the web conference and the evaluation result of the web conference. The visualizer 606 displays the display screen 1200 generated by the information generator 613 on the display unit such as the display 306, by using the display controller 603.

FIG. 12 is a diagram illustrating an example of a display screen according to a second embodiment. In the example of FIG. 12, the display screen 1200 includes satisfaction level 1201, which is an example of an evaluation result of the web conference (communication), and an index 1202 for visualizing the web conference. The display screen 1200 may further include other information such as a remaining time 1203 of the web conference.

According to the second embodiment, the communication support system 1 can provide the participants with the evaluation result of the web conference together with the index 1202 for visualizing the web conference, for example, by the display screen 1200 as illustrated in FIG. 12.

Third Embodiment

Figure 13:
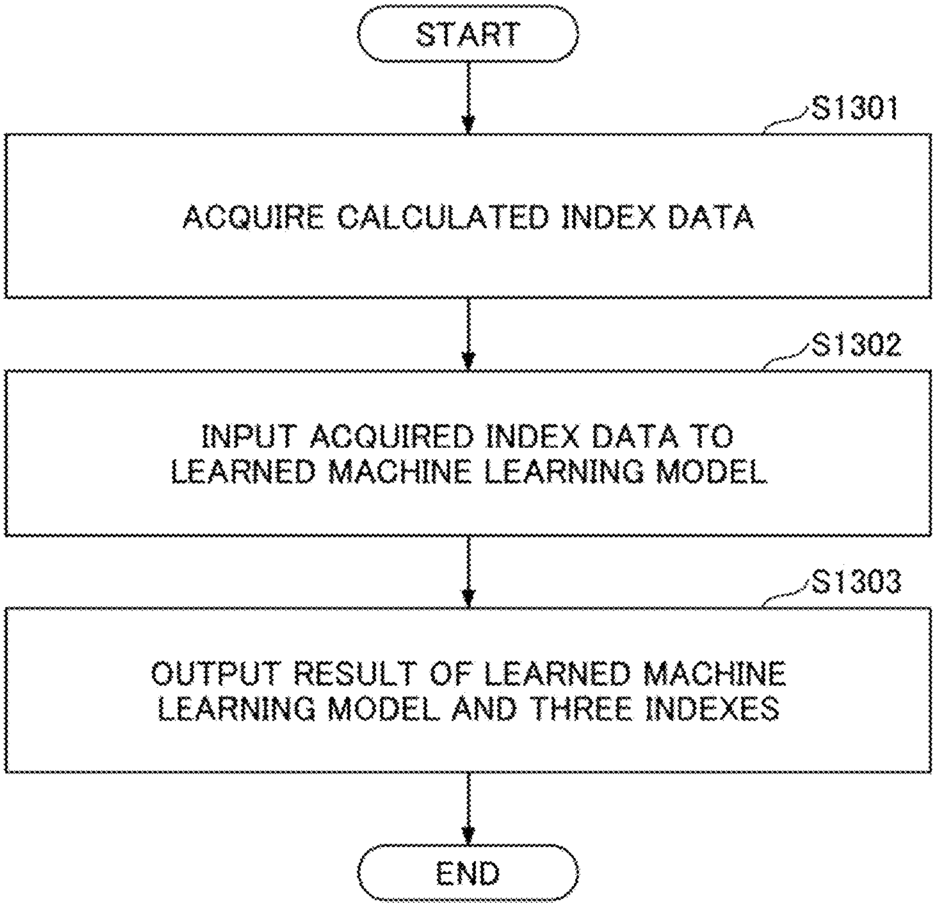
FIG. 13 is a flowchart illustrating an example of visualization processing according to a third embodiment.

FIG. 13 is a flowchart illustrating an example of visualization processing according to a third embodiment. This processing is another example of the visualization processing executed by the visualizer 606 in step 806 of FIG. 8.

In step S1301, the information generator 613 acquires the index data including "the utterance ratio (initiative)", "the utterance speed ratio (seriousness)", and "the longest utterance time ratio (superiority)" calculated by the calculator 612 in steps S803 to S805 of FIG. 8.

In step S1302, the information generator 613 inputs the acquired index data to the learned machine learning model 622, thereby acquiring information for visualizing the web conference.

Figure 14:
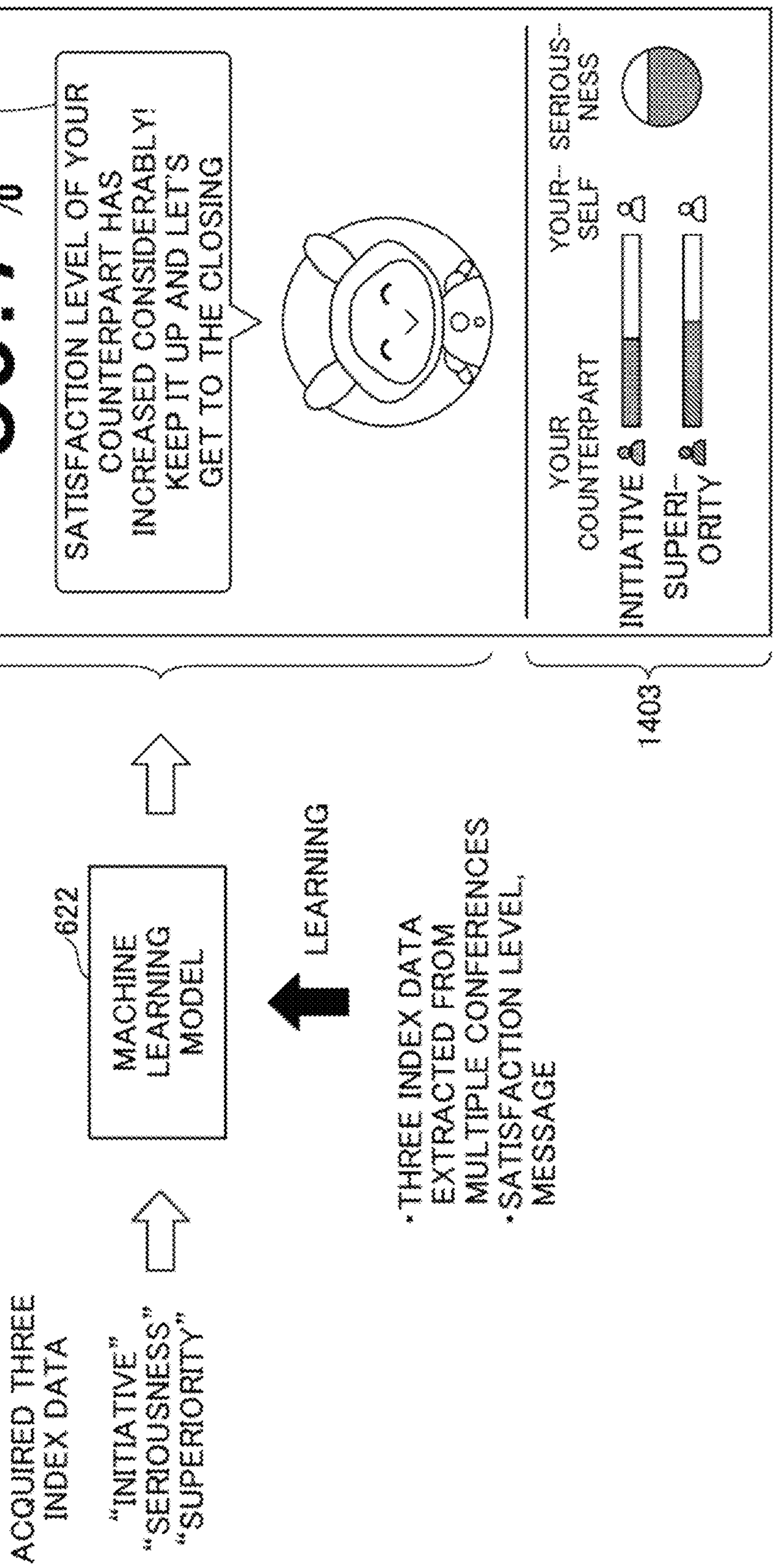
FIG. 14 is a diagram illustrating visualization processing according to the third embodiment.

FIG. 14 is a diagram illustrating visualization processing according to the third embodiment. For example, the terminal device 100 stores the learned machine learning model 622, which is obtained by performing machine learning in advance using three index data items extracted from a plurality of meetings and training data including the satisfaction level of each meeting, a message to be output, and the like, in the storage 607. In this case, the information generator 613 can acquire satisfaction level 1401 of the conference, the message 1402 to be output, and the like from the learned machine learning model 622 by inputting the index data acquired in step S1301 to the learned machine learning model 622.

The machine learning is a technique for allowing a computer to acquire a learning capability like a human being, and is a technique in which a computer autonomously generates an algorithm necessary for determination such as identification of learning data from previously acquired information and applies the algorithm to new information to make a prediction. The learning method for machine learning is not limited to supervised learning, and may be unsupervised learning, semi-supervised learning, reinforcement learning, deep learning, or the like.

As another example, the information generator 613 may transmit the acquired index data to an external server having the learned machine learning model 622, and acquire the satisfaction level 1401 of the conference, the message 1402 to be output, and the like transmitted by the external server.

In step S1303, the visualizer 606 outputs the result of the learned machine learning model 622 and three indexes (initiative, superiority, and seriousness) for visualizing the conference. For example, the visualizer 606 creates a display screen 1400 for displaying the satisfaction level 1401 of the conference, a message 1402, three indexes 1403 for visualizing the conference, and the like, as illustrated in FIG. 14, for example, by using the information generator 613.

Further, when the terminal device 100 includes the visualizer 606, the visualizer 606 displays (outputs) the created display screen 1400 on the display unit such as the display 306 by using the display controller 603. On the other hand, when the conference server 10 includes the visualizer 606, the visualizer 606 transmits (outputs) the created display screen 1400 to the terminal device 100 by using the web server 704.

According to the third embodiment, the communication support system 1 can provide the participants with the indexes 1403 for visualizing the web conference, the satisfaction level 1401 of the conference, and the message 1402 according to the situation, for example, by the display screen 1400 as illustrated in FIG. 14. The message 1402 is another example of information indicating how to proceed with communication.

(Application Example)

In the above embodiments, the communication supported by the communication support system 1 is a web conference in which a participant and another participant have a business negotiation. However, the communication supported by the communication support system 1 is not limited to this, and may be various communications such as remote medical care, counseling, remote class, or school consultation.

Figure 15:
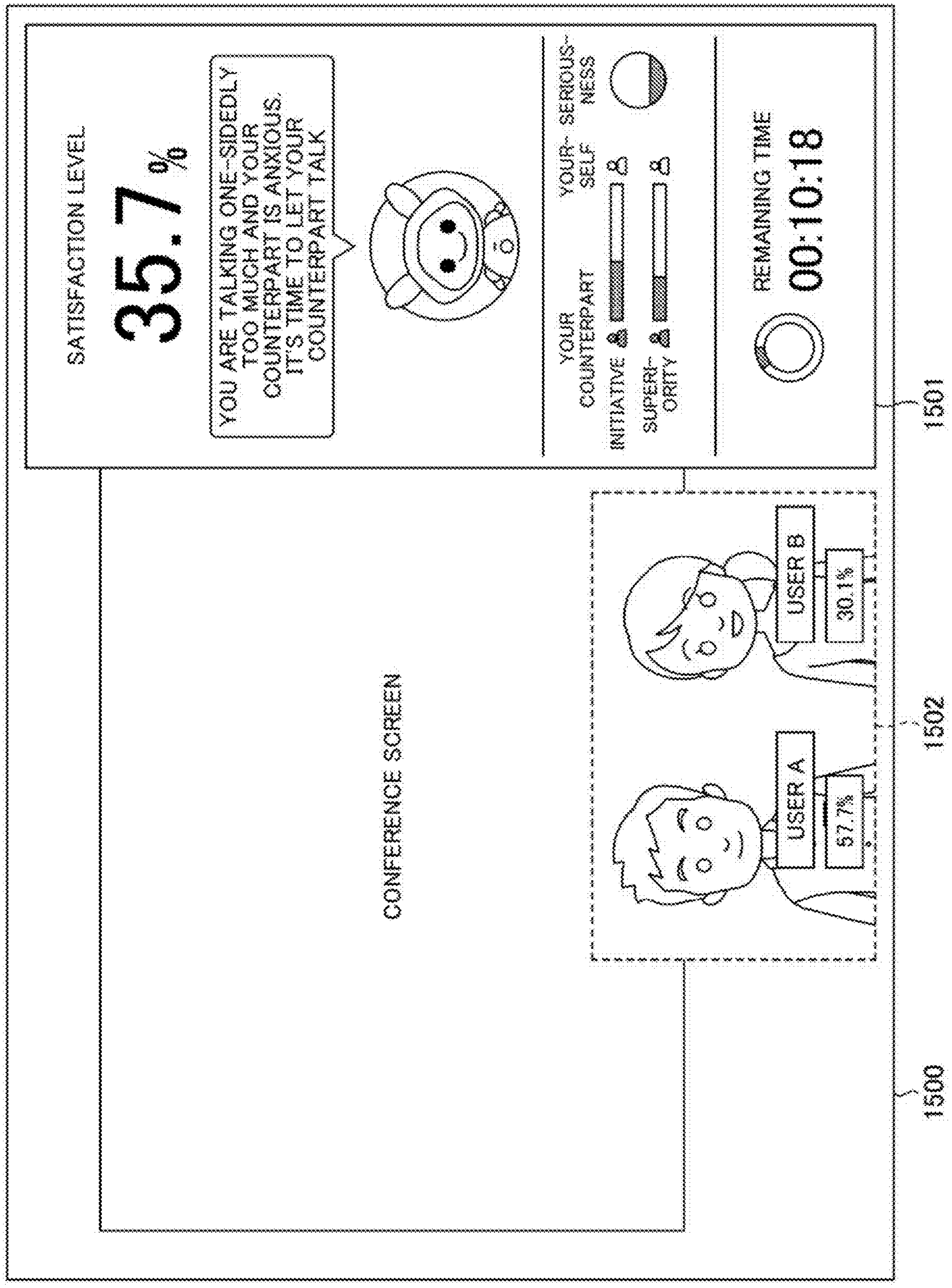
FIG. 15 is a diagram illustrating an application example according to an embodiment.

In the above embodiments, the example in which the participant and the other participant communicate each other on a one-to-one basis has been described, but the participant may communicate with two or more other participants. In this case, for example, as illustrated in FIG. 15, the communication support system 1 may display a display screen 1502 for displaying satisfaction levels of other participants in the conference on the display screen 1500 of the terminal device 100 in addition to a display screen 1501 of the support application described in the first to third embodiments. Thus, the participant can easily understand that the satisfaction level of a user A is relatively high and the satisfaction level of a user B is relatively low, for example, so that the participant can therefore speak to the user B.

The satisfaction level of the user A with the conference may be obtained from the utterance ratio of the utterance time of the user A to the utterance time of the participant, the utterance speed ratio of the utterance speed of the user A to the utterance speed of the participant, and the longest utterance time ratio of the longest utterance time of the user A to the longest utterance time of the participant.

Similarly, the satisfaction level of the user B with the conference may be obtained from the utterance ratio of the utterance time of the user B to the utterance time of the participant, the utterance speed ratio of the utterance speed of the user B to the utterance speed of the participant, and the longest utterance time ratio of the longest utterance time of the user B to the longest utterance time of the participant.

Fourth Embodiment

In the first to third embodiments, the examples of the cases where the communication is visualized using the indexes such as the initiative, the seriousness, and the superiority has been described, but the communication support system 1 may visualize the communication using other information.

For example, the communication support system 1 may visualize the communication, based on an utterance volume of a participant and an utterance volume of another participant. As a specific example, the communication support system 1 may output a display screen on which changes in the utterance volumes of the participant and the other participant are displayed in time series. This makes it easy to understand a situation of communication, for example, a change in excitement of conversation, no response (or a slow response) from one participant after the other participant speaks, or a sudden increase in the utterance volume of the other participant.

The communication support system 1 may visualize the communication, based on the utterance frequency (the fundamental frequency $f_0$) of the participant and the utterance frequency of the other participant. As a specific example, the communication support system 1 may output a display screen on which changes in the utterance frequencies of the participant and the other participant are displayed in time series. The utterance frequency (the fundamental frequency of each utterance) represents the communication situation such as the atmosphere, emotion, or understanding of the communication. The communication support system 1 may visualize communication, based on the utterance volume and the utterance frequency of the participant and the utterance volume and the utterance frequency of the other participant.

The communication support system 1 may output not only the utterance volume or the utterance frequency in time series but also, for example, a silence time of the entire communication or the number of speaker changes, as information for visualizing the communication.

<Processing Flow>

Figure 16:
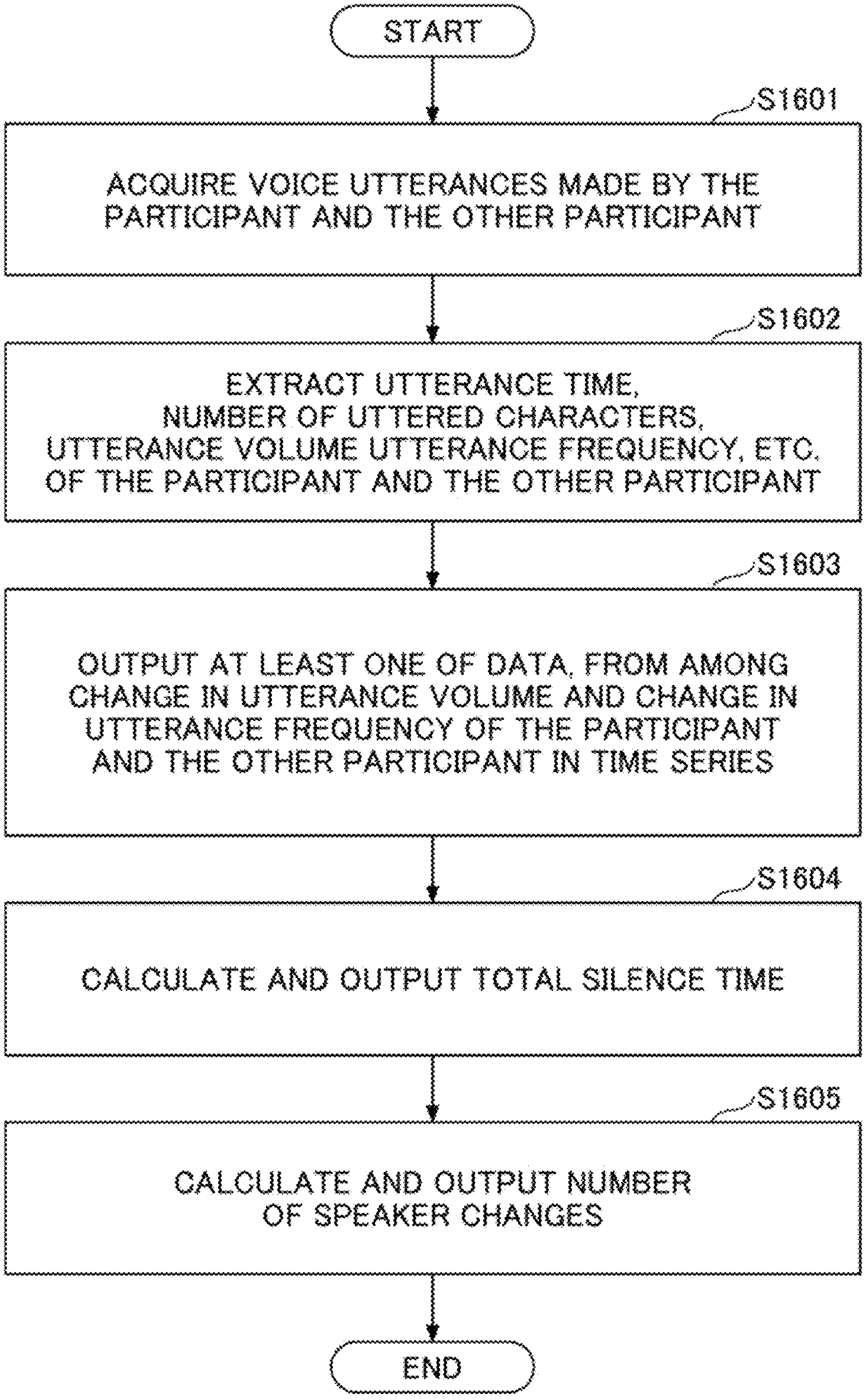
FIG. 16 is a flowchart illustrating an example of communication support processing according to a fourth embodiment.

FIG. 16 is a flowchart illustrating an example of the communication support processing according to a fourth embodiment. Note that, here, a detailed description of the same processing as in the first to third embodiments will be omitted.

In the S1601, the acquisition unit 605 acquires the voices utterance made by the participant and the other participant participating in the communication (e.g., the web conference).

In step S1602, the extractor 611 extracts the utterance time, the number of uttered characters, the utterance volume, the utterance frequency, and the like of each of the participant and the other participant from the voice acquired by the acquisition unit 605, and creates the extracted data 1700 as illustrated in FIG. 17, for example.

FIG. 17 is a diagram illustrating an example of extraction data according to the fourth embodiment. In the example of FIG. 17, an extraction data 1700 includes data such as “utterance start time”, “utterance end time”, “utterance time”, “speaker”, “number of uttered characters”, “utterance ratio”, “longest utterance time ratio”, “utterance volume”, and “utterance frequency” as items. In addition, in the extraction data 1700, each row corresponds to one utterance. In the example of FIG. 17, a silent period in which the participant and the other participant do not utter is also converted into data as one utterance.

The “utterance start time” and the “utterance end time” are data representing the start date and time and the end date and time of each utterance. The “utterance time” is data representing a period from the “utterance start time” to the “utterance end time” of each utterance. The “speaker” indicates a speaker of each utterance. In the example of FIG. 17, “A” indicates an utterance of the participant, “B” indicates an utterance of the other participant, and “-” indicates silence during which there is no speaker.

The “number of uttered characters”, the “utterance ratio”, and the “longest utterance time ratio” are data representing the number of characters extracted from each utterance, the ratio of utterances, and the ratio of the longest utterance times, as in the first to third embodiments. The “utterance volume” is data representing the volume (e.g., average volume) of each utterance, which is newly extracted in the fourth embodiment. The “utterance frequency” indicate a frequency of each utterance (e.g., mean value of the fundamental frequencies $f_0$), which are newly extracted in the fourth embodiment.

Now returning to FIG. 16, the description of the flowchart will be continued. In step S1603, the visualizer 606 outputs at least one of data, from among a change in the utterance volume and a change in the utterance frequency of the participant and the other participant in time series. For example, the visualizer 606 outputs an utterance volume of a speaker “A” (participant) and an utterance volume of a speaker “B” (other participant) separately in time series from the data of the “utterance volume” of the extraction data 1700 described in FIG. 17. The visualizer 606 may output an utterance frequency of the speaker “A” (participant) and an utterance frequency of the speaker “B” (the other participant) separately in time series from the data of the “utterance frequency” of the extraction data 1700.

In step S1604, the visualizer 606 calculates and outputs the total silence time of the entire communication. For example, the visualizer 606 sums up the utterance time in which the speaker is “-” (silent) in the “utterance time” of the extraction data 1700 described in FIG. 17 and outputs the sum.

In step S1605, the visualizer 606 calculates and outputs the number of speaker changes.

For example, the visualizer 606 refers to the data of “speaker” of the extraction data 1700 described in FIG. 17, and sums up the number of times the speaker has changed from “A” to “B” and the number of times the speaker has changed from “B” to “A”, and outputs the sum.

Figure 18:
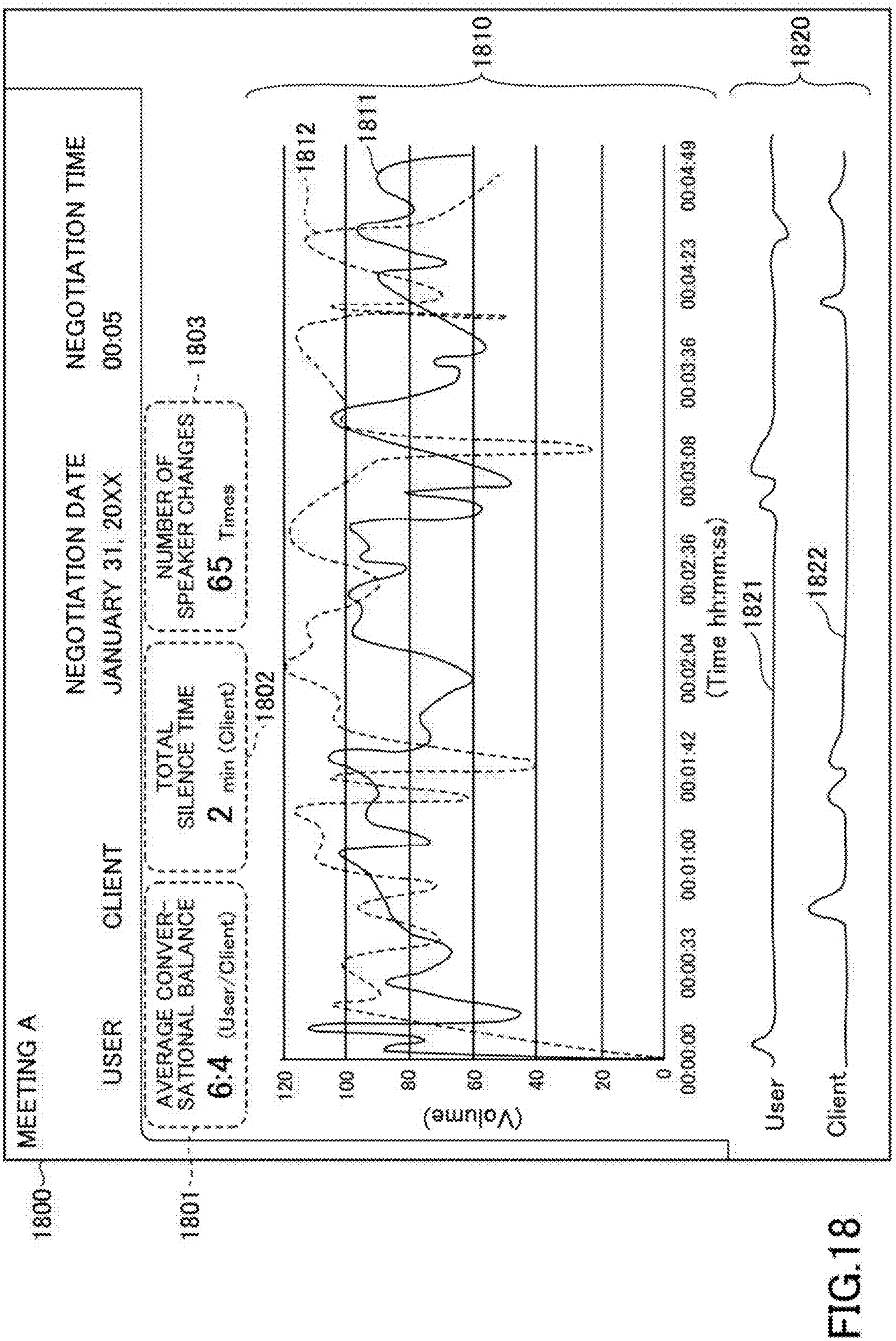
FIG. 18 is a diagram (1) illustrating an example of a display screen according to the fourth embodiment.

By the processing in FIG. 16, the visualizer 606 displays, for example, a display screen 1800 as illustrated in FIG. 18 on the display unit such as the display 306 by using the display controller 603.

FIG. 18 is a diagram (1) illustrating an example of a display screen according to the fourth embodiment. The display screen 1800 is an example of a display screen for visualizing communication output by the visualizer 606 according to the fourth embodiment.

In the example of FIG. 18, a graph 1810 that displays an utterance volume 1811 of a user (an example of a participant) and an utterance volume 1812 of a client (an example of another participant) in time series is displayed on the display screen 1800. The graph 1810 is an example of information for visualizing communication, which is output by the visualizer 606 in step S1603 of FIG. 16. Note that the visualizer 606 may display a graph that displays the utterance frequency of the user and the utterance frequency of the client in time series on the display screen 1800 instead of (or in addition to) the graph 1810.

The display screen 1800 also displays information such as a total silence time 1802 and the number of speaker changes 1803. These pieces of information are examples of information for visualizing communication output by the visualizer 606 in steps S1604 and S1605 of FIG. 6.

The visualizer 606 may further display, on the display screen 1800, for example, a graph 1820 representing a change in the utterance frequency between the user and the client, a change in the utterance speed between the user and the client, or the like in time series. The visualizer 606 may further display visualization data such as an average conversation balance 1801 on the display screen 1800. The average conversation balance 1801 is represented by, for example, an utterance time ratio, an utterance volume ratio, or the like of the user to the client.

In this manner, the communication support system 1 may output information for visualizing communication independent of the indexes such as initiative, seriousness, and superiority.

Application Example

The communication support system 1 may output an alert when a problem occurs in communication or when a problem is likely to occur in communication.

Figure 19:
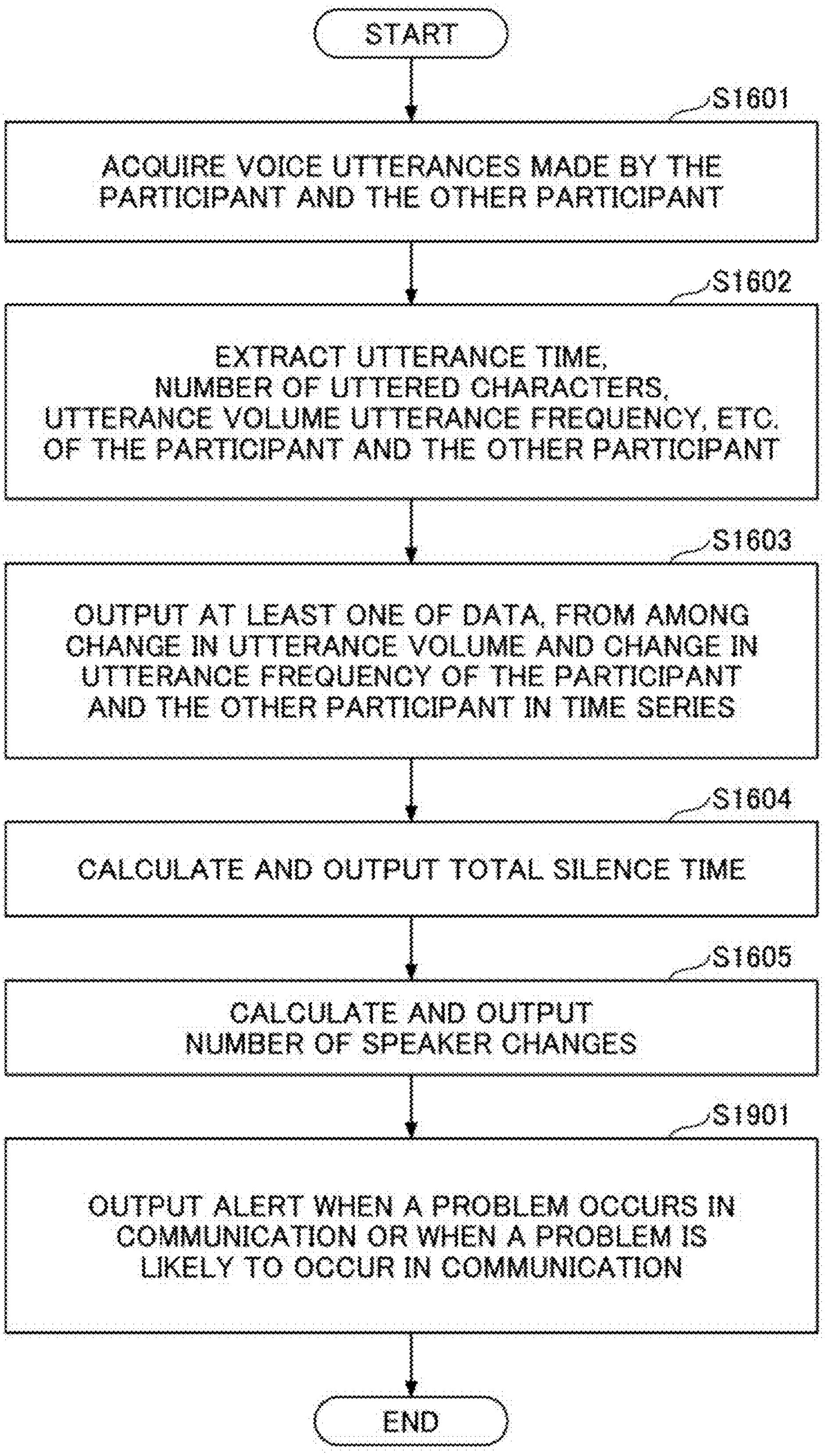
FIG. 19 is a flowchart illustrating an application example of communication support processing according to the fourth embodiment.

FIG. 19 is a flowchart illustrating an application example of the communication support processing according to the fourth embodiment. Note that, in the processing illustrated in FIG. 19, the processing of steps S1601 to S1605 is the same as the processing described in FIG. 16, and thus description thereof will be omitted here.

In step S1901, the visualizer 606 outputs an alert when a problem occurs in communication or a problem is likely to occur in communication, based on the information output by the visualizer 606.

Figure 20:
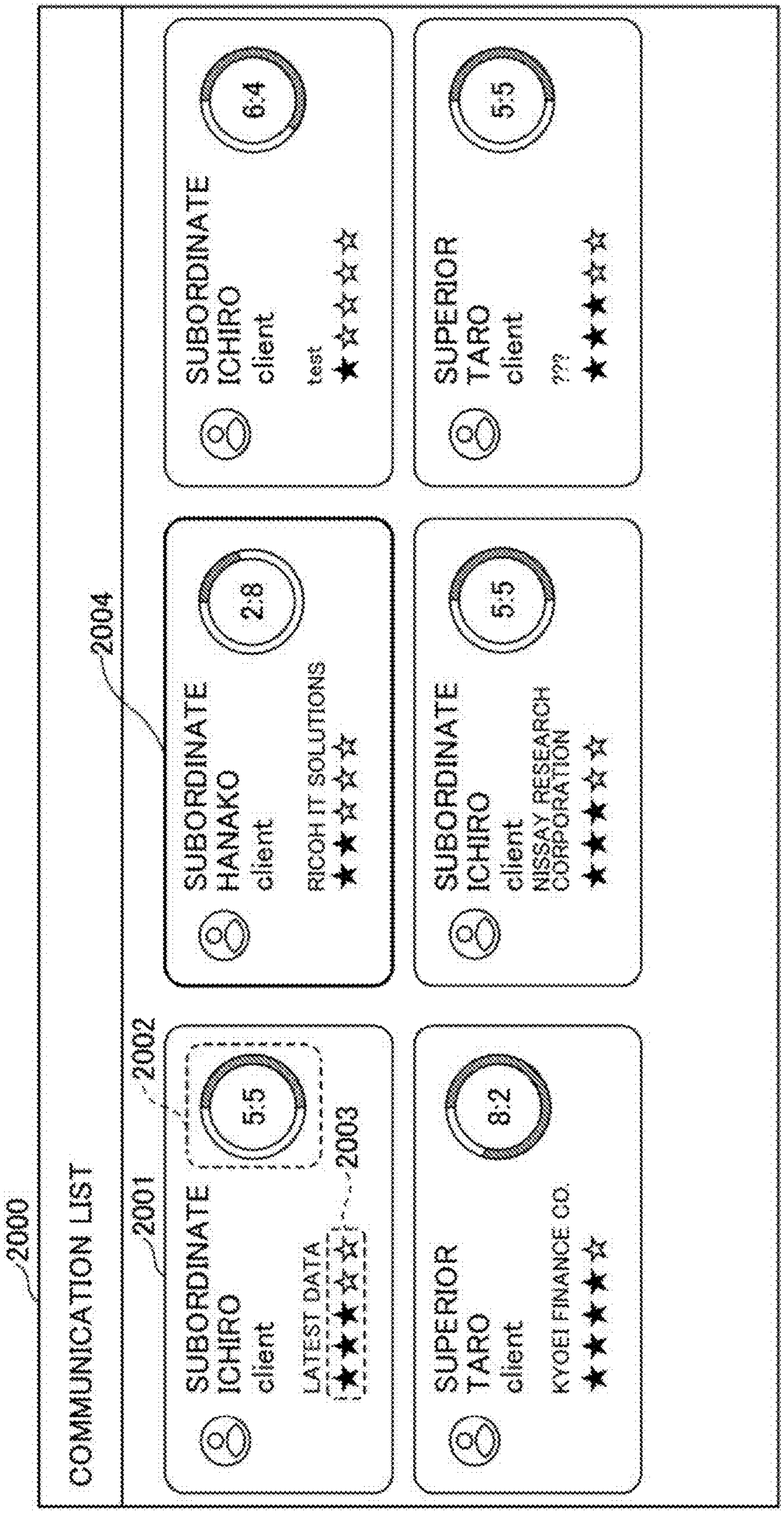
FIG. 20 is a diagram (2) illustrating an example of a display screen according to the fourth embodiment.

For example, the visualizer 606 can display a communication list screen 2000 as illustrated in FIG. 20 on an information terminal or the like of the administrator or the like. In the example of FIG. 20, a summary 2001 of business negotiation (an example of communication) held by a plurality of users to be managed is displayed on the communication list screen 2000. Each summary 2001 displays, for example, a user name, a client name, a business negotiation evaluation 2003, and visualization data 2002 output by the visualizer 606.

For example, when the value of the visualization data 2002 exceeds a predetermined threshold (or does not reach the threshold), the visualizer 606 may determine that a problem has occurred in the business negotiation and output an alert by highlighting 2004 the summary of the business negotiation. Alternatively, when the evaluation 2003 of the negotiation does not satisfy a predetermined evaluation, the visualizer 606 may highlight 2004 the summary of the negotiation and output an alert. The alert is not limited to the highlighting, and may be, for example, an electronic mail, a voice message, or the like.

Fifth Embodiment

In the third embodiment, an example in which the communication support system 1 inputs indexes such as initiative, seriousness, and superiority to a learned machine learning model and outputs a message or the like according to the satisfaction level and the situation of a conference has been described. However, the communication support system 1 may output a message or the like according to the satisfaction level and the situation of the conference using other information.

<Processing Flow>

Figure 21:
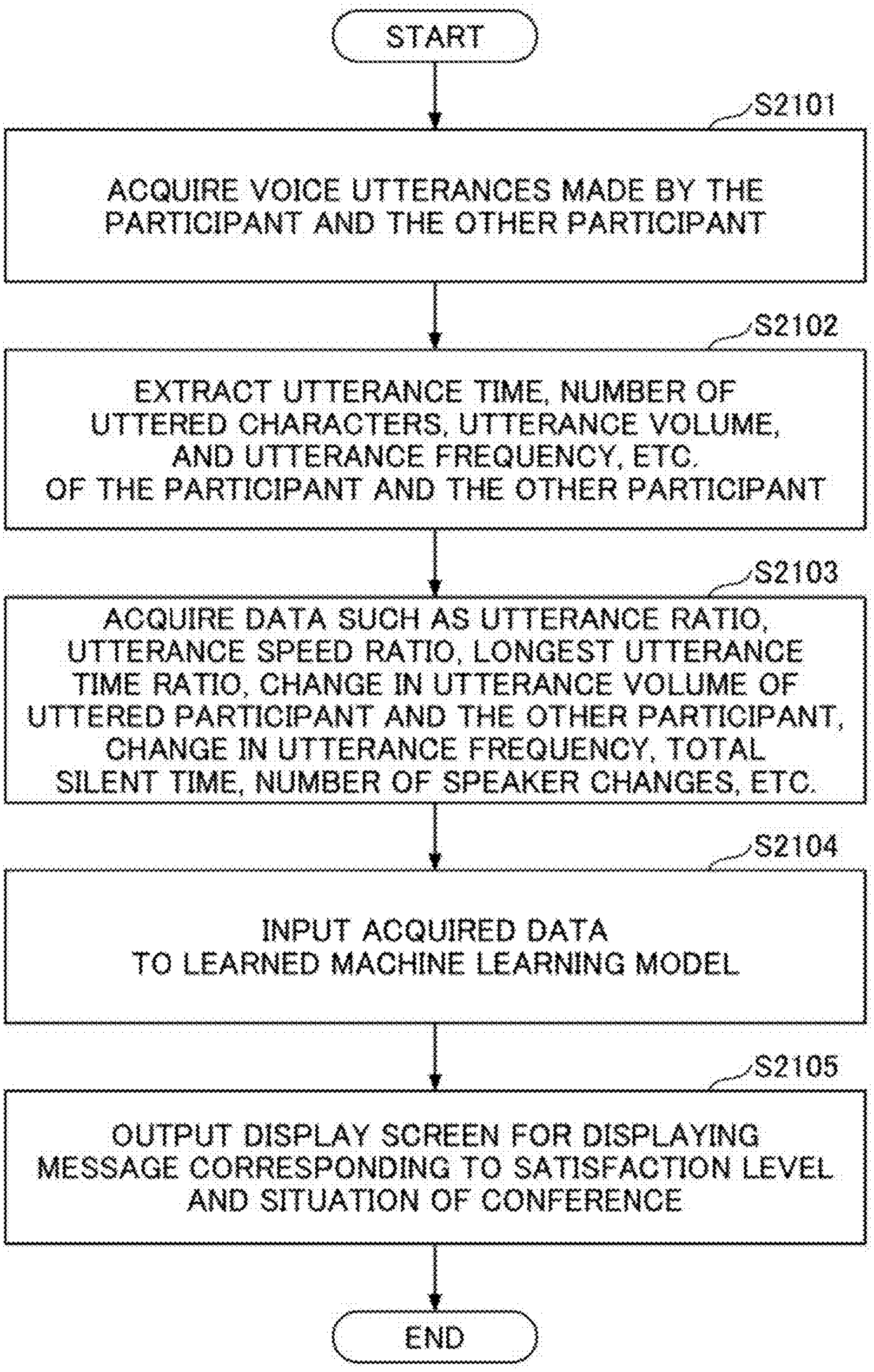
FIG. 21 is a flowchart illustrating an example of visualization processing according to a fifth embodiment.

FIG. 21 is a flowchart illustrating an example of visualization processing according to a fifth embodiment. Note that detailed description of processing similar to the visualization processing according to the fourth embodiment described with reference to FIG. 16 will be omitted.

In the S2101, the acquisition unit 605 acquires the voices utterance made by the participant participating in the communication (e.g., the web conference) and the other participant.

In step S2102, the extractor 611 extracts the utterance time, the number of uttered characters, the utterance volume, the utterance frequency, and the like of the participant and the other participant from the voices acquired by the acquisition unit 605, and creates the extracted data 1700 as illustrated in FIG. 17, for example.

In step S2103, the visualizer 606 acquires data such as the utterance ratio, the utterance speed ratio, the longest utterance time ratio, the change in utterance volume of the uttered participant and the other participant, the change in utterance frequency, the total silence time, the number of speaker changes, and the like from the extracted data 1700. At this time, the visualizer 606 does not necessarily have to acquire all the data described above, and may acquire a combination of data in advance from the extracted data described above, for example.

In step S2104, the visualizer 606 inputs the acquired data to the learned machine learning model 622. Thus, the learned machine learning model outputs, for example, a message or the like corresponding to the satisfaction level and the situation of the conference.

In step S2105, the visualizer 606 displays a display screen for displaying a message corresponding to the satisfaction level and the situation of the conference.

Figure 22:
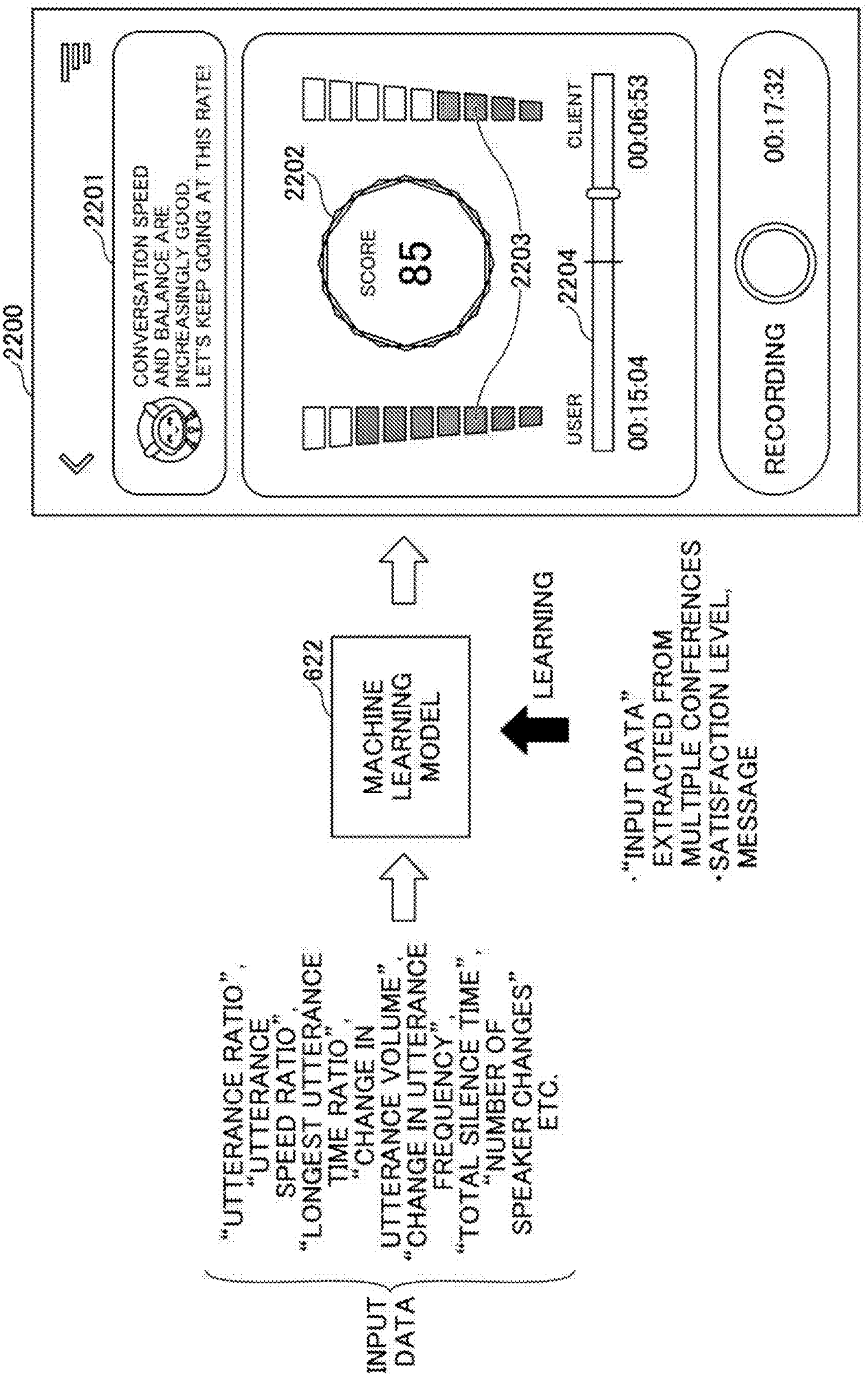
FIG. 22 is a diagram illustrating visualization processing according to the fifth embodiment.

FIG. 22 is a diagram illustrating visualization processing according to the fifth embodiment. As an example, the communication support system 1 stores the learned machine learning model 622 obtained by performing machine learning in advance using a plurality of input data extracted from a plurality of conferences and training data including the satisfaction level of each conference, a message to be output, and the like. The plurality of input data are the utterance ratio, the utterance speed ratio, the longest utterance time ratio, the change in the utterance volume of the participant and the other participant, the change in utterance frequency, the total silence time, the number of speaker changes, and the like, which are acquired in step S2103 of FIG. 21.

Thus, the visualizer 606 can acquire satisfaction level 2202 of the conference, the message 2201 to be output, and the like from the learned machine learning model 622 by inputting the input data acquired in step S2103 to the learned machine learning model 622.

The visualizer 606 displays, for example, a display screen 2200 as illustrated in FIG. 22 by using the acquired satisfaction level 2202 of the conference, the message 2201 to be output, and the like. In the example of FIG. 22, the display screen 2200 displays, in addition to the satisfaction level 2202 of the conference and the message 2201 to be output, comparison data 2203 of the conversation speed between the participant and the other participant, comparison data 2204 of the utterance time between the participant and the other participant, and the like.

In this way, the communication support system 1 may output information for visualizing communication independent of the indexes such as initiative, seriousness, and superiority.

As described above, according to each embodiment of the present disclosure, it is possible to provide a communication support system capable of supporting communication without pre-registering information of a participant who participates in communication and information of the other participant.

According to the communication support system 1 of the present embodiment, since it is not necessary to analyze contents of the utterance of the participants participating in the communication, it is possible to expect a special effect that there is no risk of infringing the privacy of the participants or it is easy to handle a foreign language.

<Supplementary Explanation>

Each function of each of the embodiments described above can be implemented by one or a plurality of processing circuitries. Here, the "processing circuitry" in the present specification includes a processor programmed to execute each function by software, such as a processor implemented by an electronic circuit, and a device such as an application specific integrated circuit (ASIC), a digital signal processor (DSP), a field programmable gate array (FPGA), or a conventional circuit module designed to execute each function described above.

Furthermore, the group of the devices described in the examples represent only one of many computing environments for implementing the embodiments disclosed herein. In some embodiments, the conference server 10 includes a plurality of computing devices, such as a server cluster. The computing devices are configured to communicate with each other via any type of communication link, including a network, shared memory, etc., and perform the processing disclosed herein.

Furthermore, the conference server 10 and the terminal device 100 can be configured to share the disclosed processing steps, for example, the processing illustrated in FIGS. 8 to 10, 13, 16, 19, and 21 in various combinations. For example, the processing executed by the acquisition unit 605 may be executed by the conference server 10 or the terminal device 100. Similarly, the processing executed by the visualizer 606 may be executed by the conference server 10 or the terminal device 100. The elements of the conference server 10 may be integrated into one server device or may be distributed into a plurality of devices.

Although the present disclosure has been described based on the embodiments, the present disclosure is not limited to the above-described embodiments, and various modifications can be made within the scope of the claims.

What is claimed is:

1. A communication support system comprising:

processing circuitry configured to acquire a voice utterance made by a participant participating in communication and a voice utterance made by another participant participating in the communication;

output a plurality of pieces of information for visualizing a situation of the communication, based on an utterance time of the participant and an utterance time of the other participant; and output information for evaluating the communication based on an average of correlation coefficients calculated between the plurality of pieces of information for visualizing the communication outputted and index data of a plurality of usage scenarios of a first past communication associated with an evaluation value equal to or greater than a predetermined threshold, and an average of correlation coefficients calculated between the plurality of pieces of information for visualizing the communication outputted and index data of a plurality of usage scenarios of a second past communication associated with an evaluation value less than the predetermined threshold, the index data stored in a memory.

2. The communication support system according to claim 1, wherein:

the plurality of pieces of information for visualizing the communication includes a first index based on a ratio of the utterance time of the other participant to the utterance time of the participant.

3. The communication support system according to claim 2, wherein:

the first index represents initiative of the participant or the other participant in the communication.

4. The communication support system according to claim 1, wherein:

the processing circuitry outputs the plurality of pieces of information for visualizing the situation of the communication based further on a number of uttered characters by the participant and the number of uttered characters by the other participant.

5. The communication support system according to claim 4, wherein:

the plurality of pieces of information for visualizing the communication further includes a second index based on a ratio of an utterance speed of the other participant to an utterance speed of the participant.

6. The communication support system according to claim 5, wherein:

the second index represents seriousness of the participant or the other participant in the communication.

7. The communication support system according to claim 1, wherein:

the plurality of pieces of information for visualizing the communication further includes a third index based on a ratio of a longest utterance time for which the other participant continuously utters to a longest utterance time for which the participant continuously utters.

8. The communication support system according to claim 7, wherein:

the third index represents superiority of the participant or the other participant in the communication.

9. The communication support system according to claim 1, wherein:

the processing circuitry further outputs information indicating how to proceed with the communication, based on one or more of the output indexes.

10. The communication support system according to claim 1, wherein:

the processing circuitry outputs the plurality of pieces of information for visualizing the situation of the communication based further on an utterance volume of the participant and an utterance volume of the other participant.

11. The communication support system according to claim 10, wherein:

the processing circuitry further outputs a display screen for displaying the situation of the communication in time series.

12. The communication support system according to claim 11, wherein:

the display screen further displays information representing a silence time in the communication or information representing the number of speaker changes.

13. The communication support system according to claim 1, wherein:

the processing circuitry visualizes the situation of the communication, based further on an utterance frequency of the participant and an utterance frequency of the other participant.

14. The communication support system according to claim 1, wherein the processing circuitry is further configured to:

output an alert when the visualizing the situation of the communication regarding a problem in the communication exceeds a threshold.

15. An information processing device comprising:

processing circuitry configured to acquire a voice utterance made by a participant participating in communication and a voice utterance made by another participant participating in the communication;

output a plurality of pieces of information for visualizing a situation of the communication based on an utterance time of the participant and an utterance time of the other participant; and output information for evaluating the communication based on an average of correlation coefficients calculated between the plurality of pieces of information for visualizing the communication outputted and index data of a plurality of usage scenarios of a first past communication associated with an evaluation value equal to or greater than a predetermined threshold, and an average of correlation coefficients calculated between the plurality of pieces of information for visualizing the communication outputted and index data of a plurality of usage scenarios of a second past communication associated with an evaluation value less than the predetermined threshold, the index data stored in a memory.

16. The communication support system according to claim 15, wherein the processing circuitry is further configured to:

output an alert when the visualizing the situation of the communication regarding a problem in the communication exceeds a threshold.

17. A communication support method for causing a computer to execute a process comprising:

acquiring a voice utterance made by a participant participating in communication and a voice utterance made by another participant participating in the communication;

outputting a plurality of pieces of information for visualizing a situation of the communication based on an utterance time of the participant and an utterance time of the other participant; and outputting information for evaluating the communication based on an average of correlation coefficients calculated between the plurality of pieces of information for visualizing the communication outputted and index data of a plurality of usage scenarios of a first past communication associated with an evaluation value equal to or greater than a predetermined threshold, and an average of correlation coefficients calculated between the plurality of pieces of information for visualizing the communication outputted and index data of a plurality of usage scenarios of a second past communication associated with an evaluation value less than the predetermined threshold, the index data stored in a memory.

18. A non-transitory computer-readable recording medium storing a program for causing a computer to execute the communication support method according to claim 17.

19. The communication support method according to claim 17, further comprising:

outputting an alert when the visualizing the situation of the communication regarding a problem in the communication exceeds a threshold.

* * * * *